United States Patent
Ueda et al.

[11] Patent Number: 6,078,365
[45] Date of Patent: Jun. 20, 2000

[54] ACTIVE MATRIX LIQUID CRYSTAL PANEL HAVING AN ACTIVE LAYER AND AN INTERVENING LAYER FORMED OF A COMMON SEMICONDUCTOR FILM

[75] Inventors: Tomomasa Ueda; Yutaka Onozuka; Yujiro Hara; Shuichi Saito; Mitsushi Ikeda, all of Yokohama, Japan

[73] Assignee: Kabushiki Kaisha Toshiba, Kawasaki, Japan

[21] Appl. No.: 08/785,018

[22] Filed: Jan. 17, 1997

[30] Foreign Application Priority Data

Jan. 25, 1996 [JP] Japan .................................. 8-010833

[51] Int. Cl.[7] .......................... G02F 1/1343; G02F 1/136
[52] U.S. Cl. .................................. 349/43; 349/38; 349/39
[58] Field of Search ....................... 349/43, 38, 39

[56] References Cited

U.S. PATENT DOCUMENTS

| | | | |
|---|---|---|---|
| 5,541,748 | 7/1996 | Ono et al. .................................. | 359/59 |
| 5,668,379 | 9/1997 | Ono et al. .................................. | 349/43 |
| 5,710,611 | 1/1998 | Suzuki et al. ............................ | 349/129 |
| 5,767,926 | 6/1998 | Kim et al. .................................. | 349/38 |
| 5,852,485 | 12/1998 | Shimada et al. .......................... | 349/141 |

FOREIGN PATENT DOCUMENTS

| | | |
|---|---|---|
| 61-188967 | 8/1986 | Japan . |
| 1-185521 | 7/1989 | Japan . |

*Primary Examiner*—Kenneth Parker
*Assistant Examiner*—Julie Ngo
*Attorney, Agent, or Firm*—Oblon, Spivak, McClelland, Maier & Neustadt, P.C.

[57] ABSTRACT

An active matrix liquid crystal panel includes a plurality of thin film transistors respectively arranged adjacent to pixel electrodes, and a plurality of auxiliary capacitances. Each transistor has a semiconductor active layer, a pair of source and drain electrodes, and a gate electrode opposing the active layer via a gate insulating film. Each auxiliary capacitance has upper and lower electrodes, and a dielectric layer sandwiched between the upper and lower electrodes. The gate electrode, the lower electrode, and an address line respectively have portions formed of a common refractory metal film arranged on the insulating surface of a support substrate. The source and drain electrodes, the upper electrode, and a signal line respectively have portions formed of a common Mo film. Each pixel electrode has a portion formed of an ITO film. Each auxiliary capacitance further has an intervening layer between the dielectric layer and the upper electrode. The intervening layer has a portion formed of a semiconductor film common to the active layer of the transistor.

21 Claims, 23 Drawing Sheets

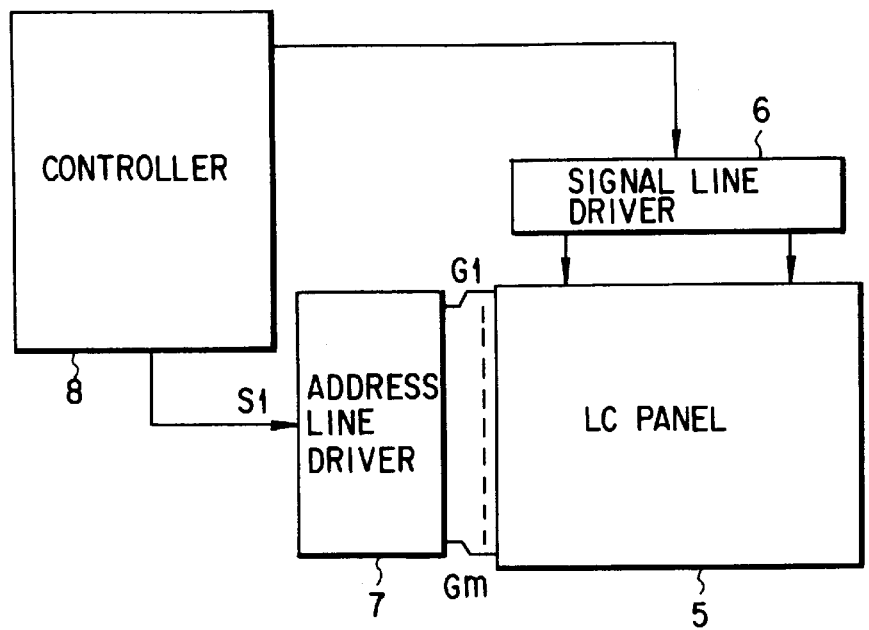
F I G. 1A
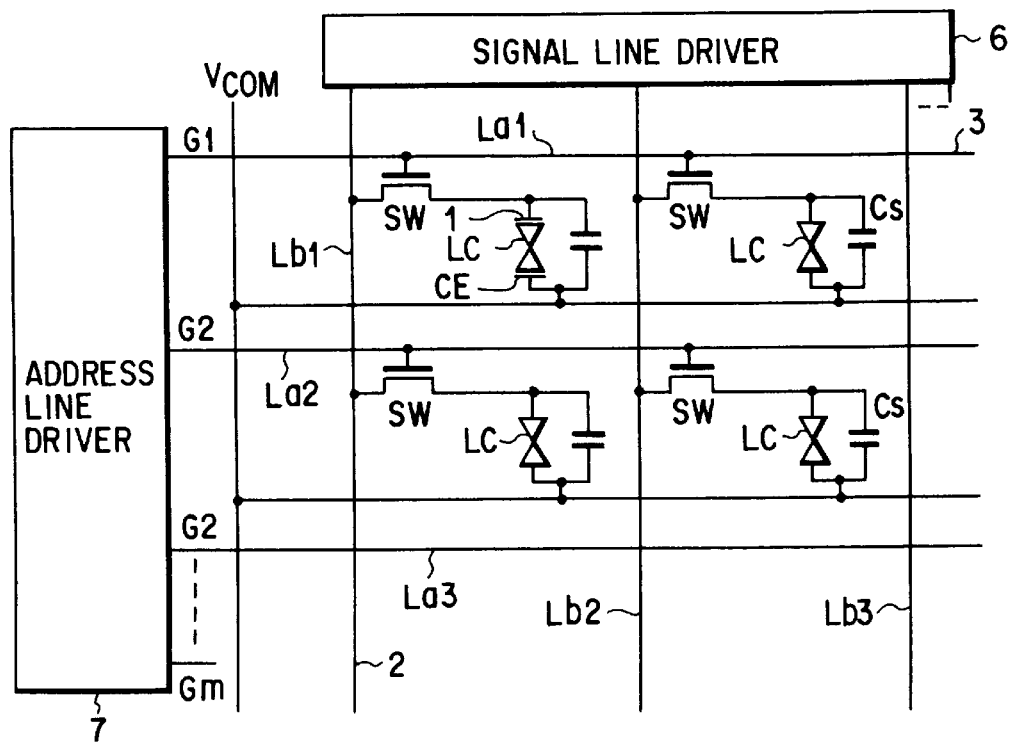
F I G. 1B

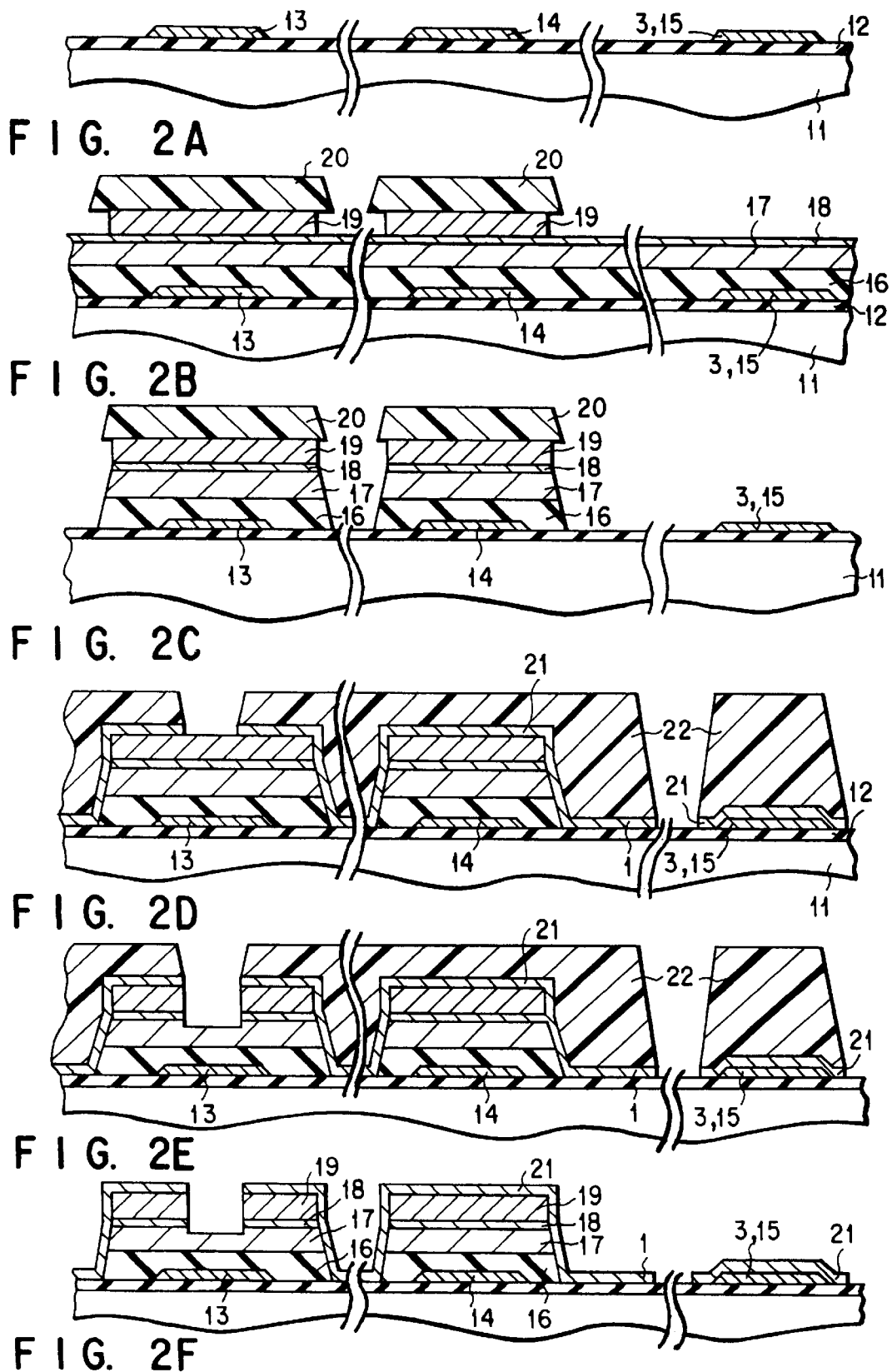

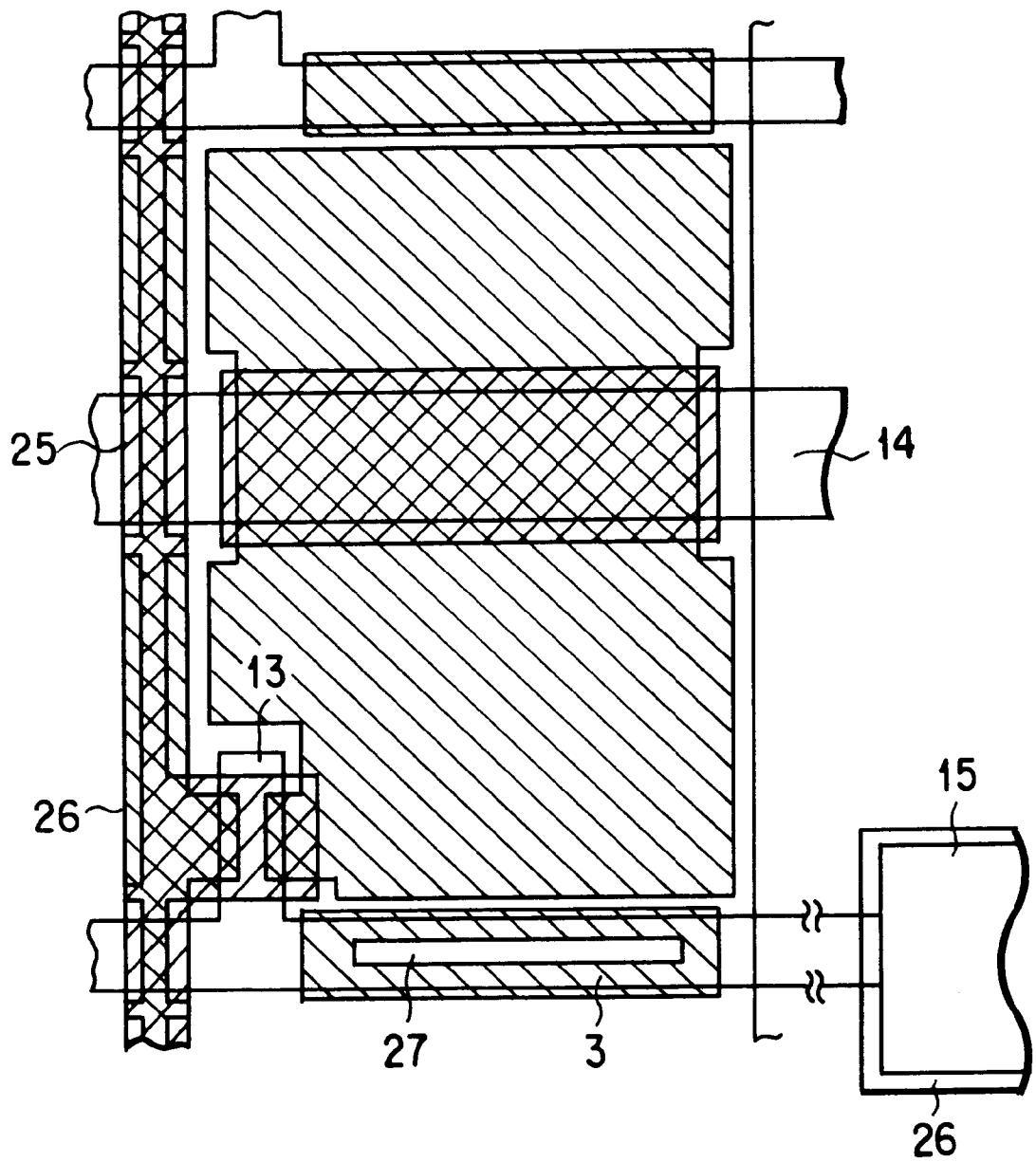
F I G. 9

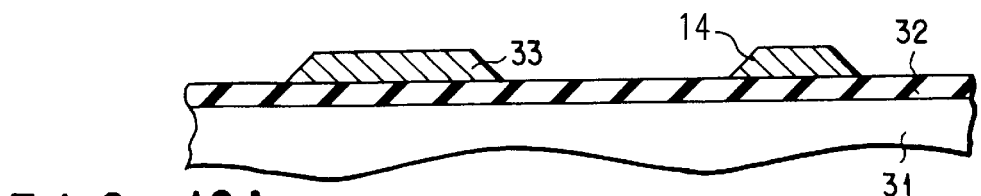
F I G. 10A
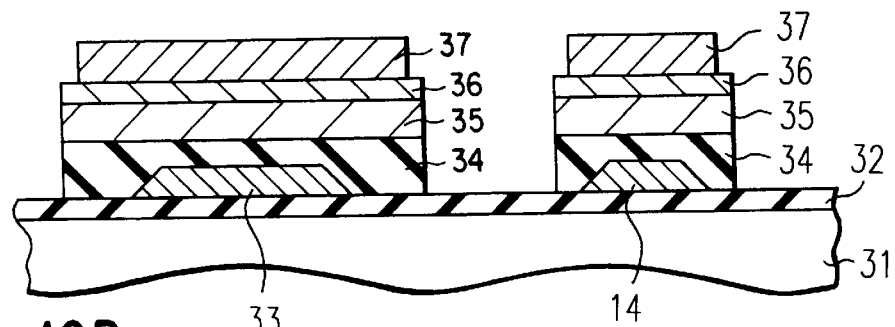
F I G. 10B
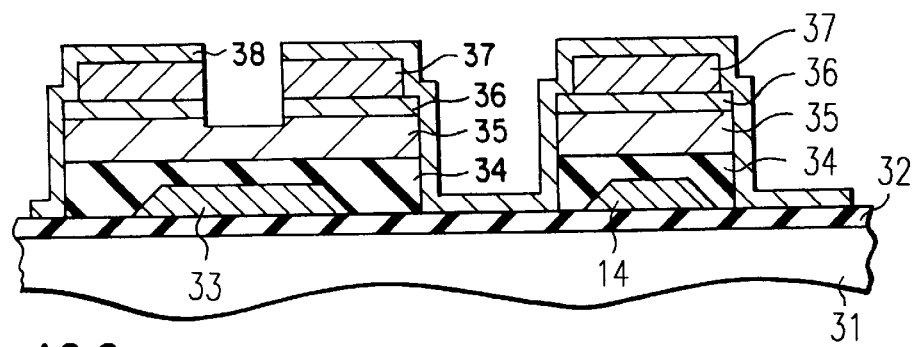
F I G. 10C
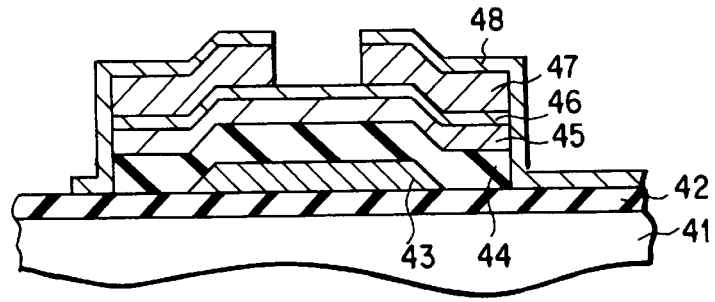
F I G. 11A
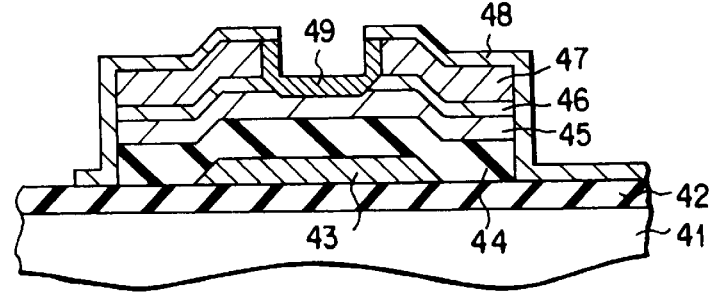
F I G. 11B

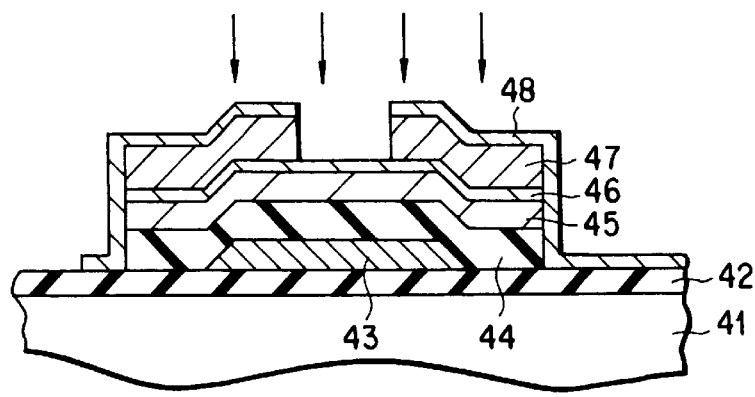
F I G. 12A
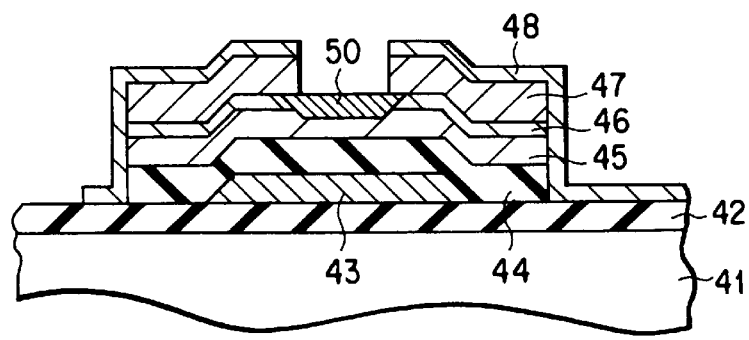
F I G. 12B
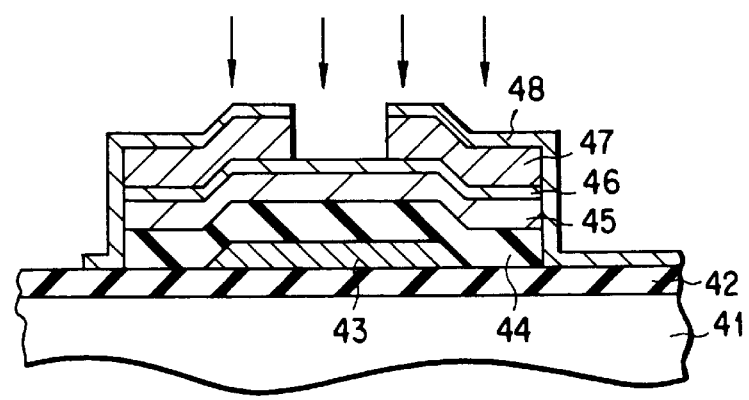
F I G. 13A
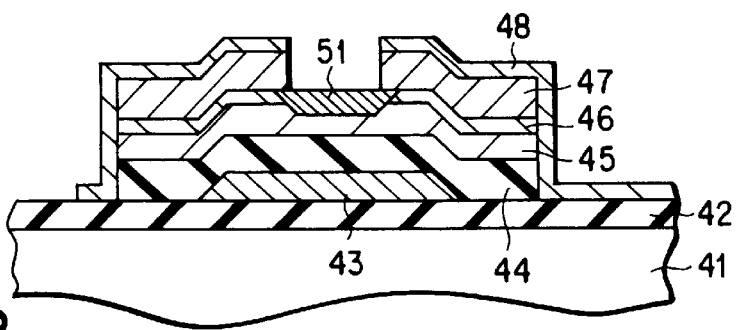
F I G. 13B

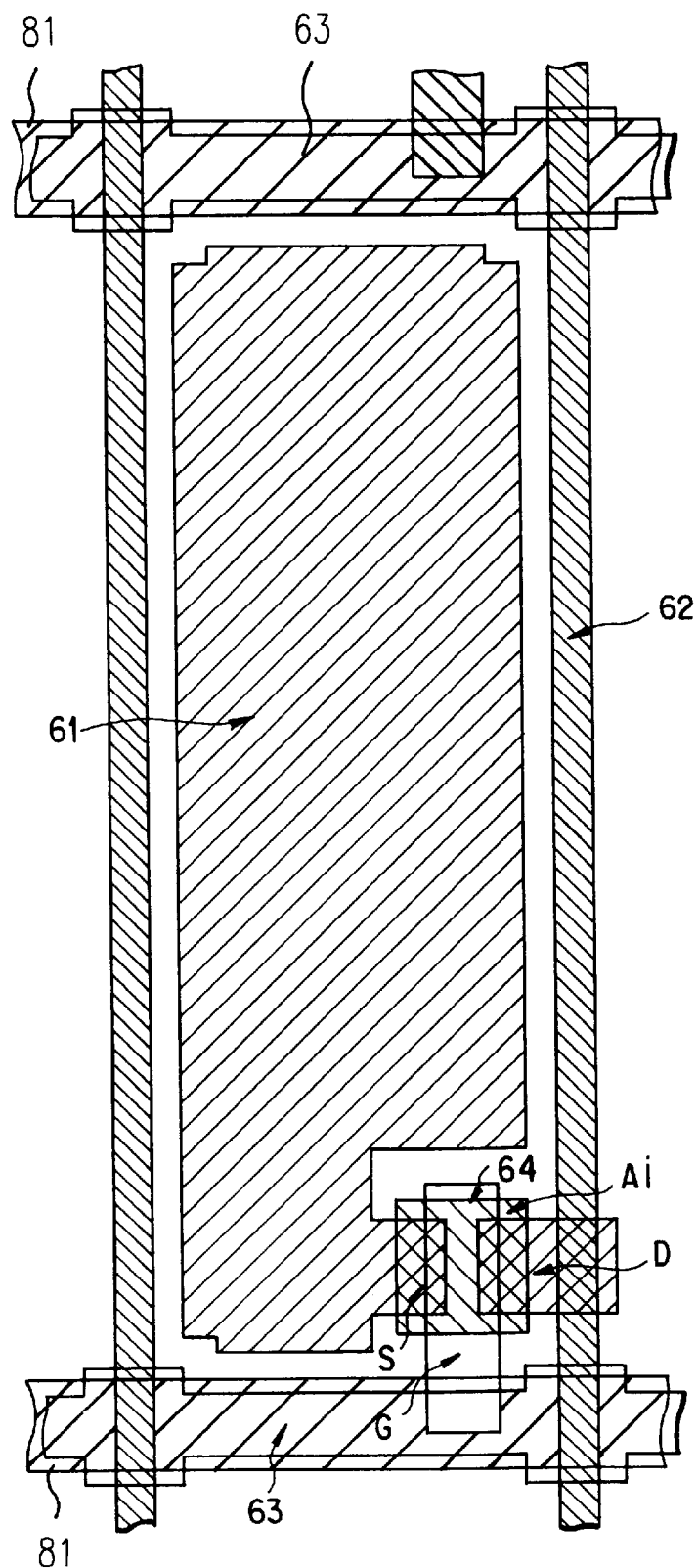
F I G. 14

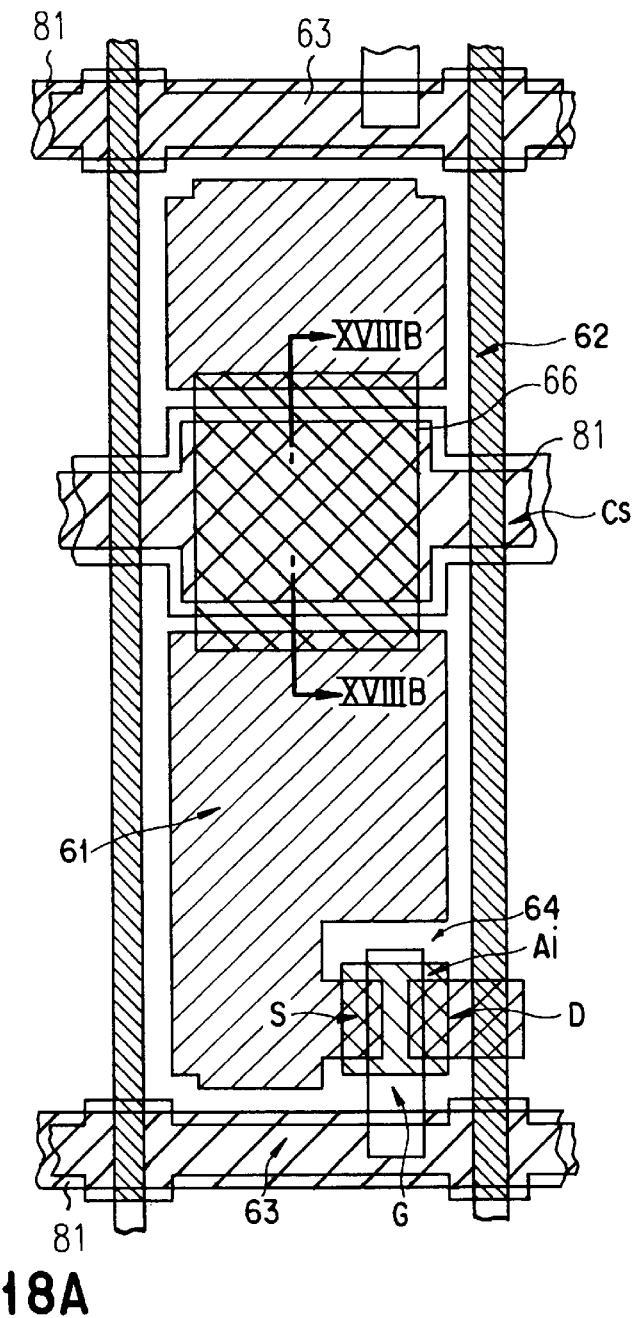
F I G. 18A
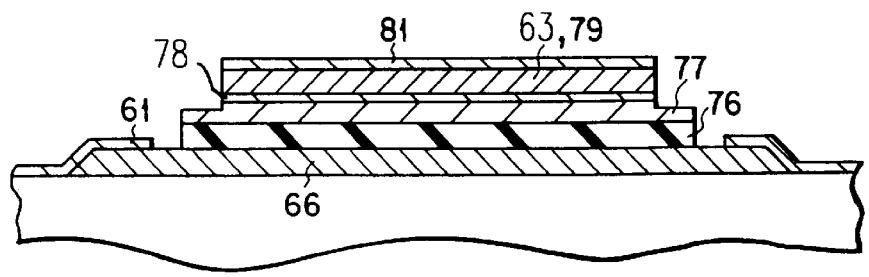
F I G. 18B

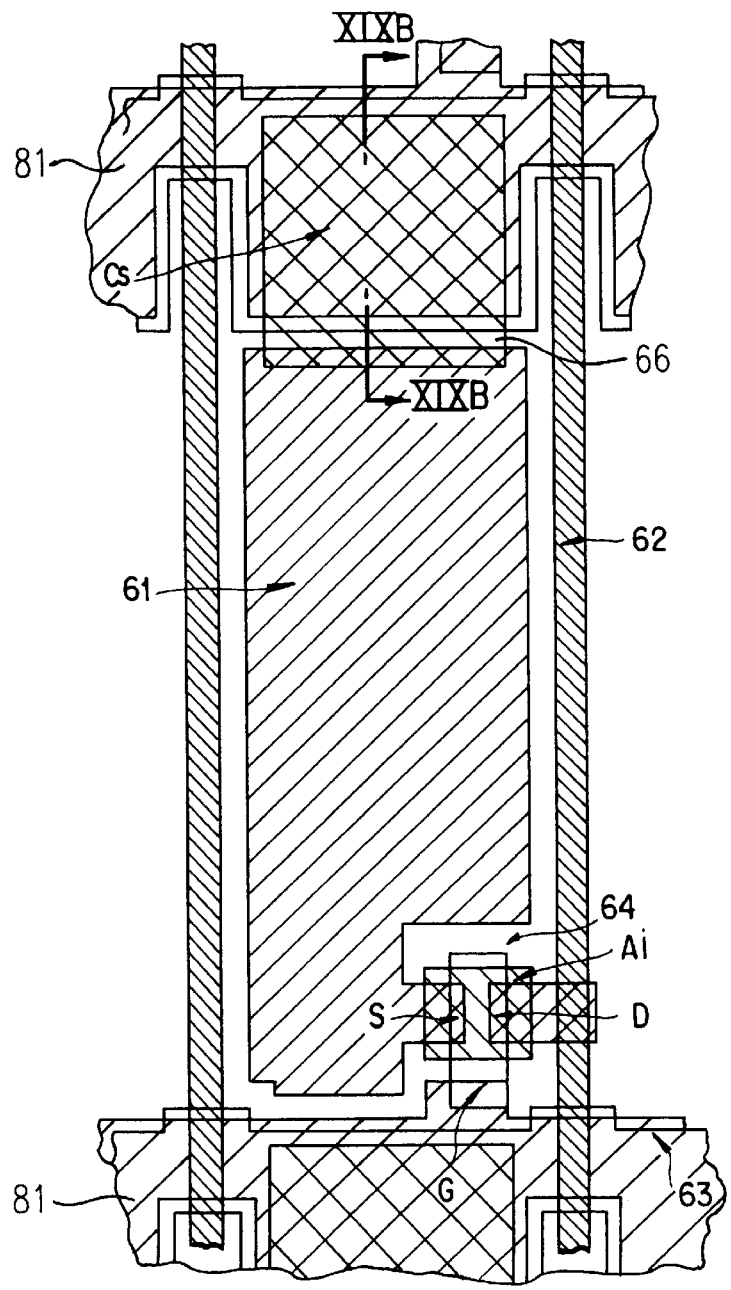
F I G. 19A
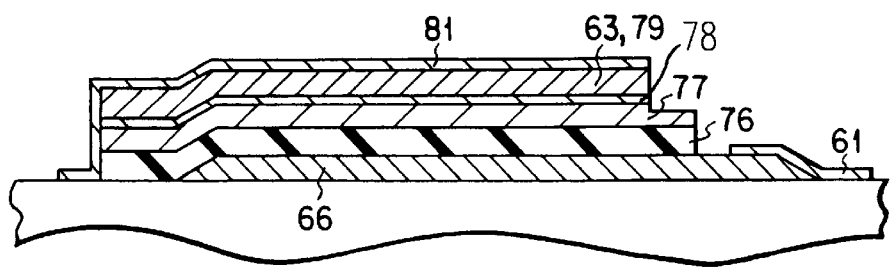
F I G. 19B

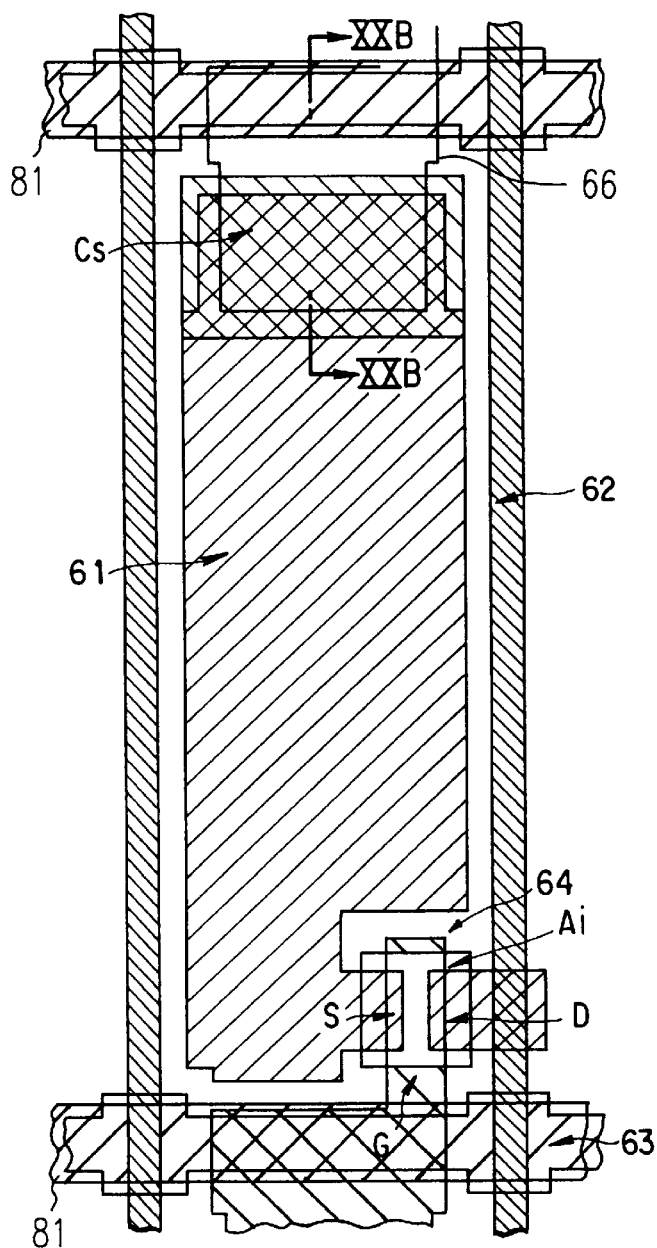
F I G. 20A
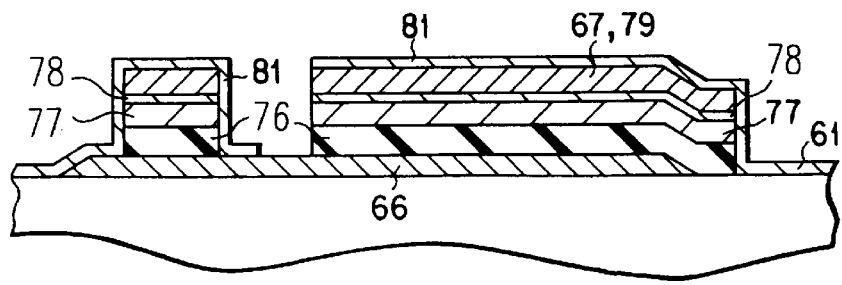
F I G. 20B

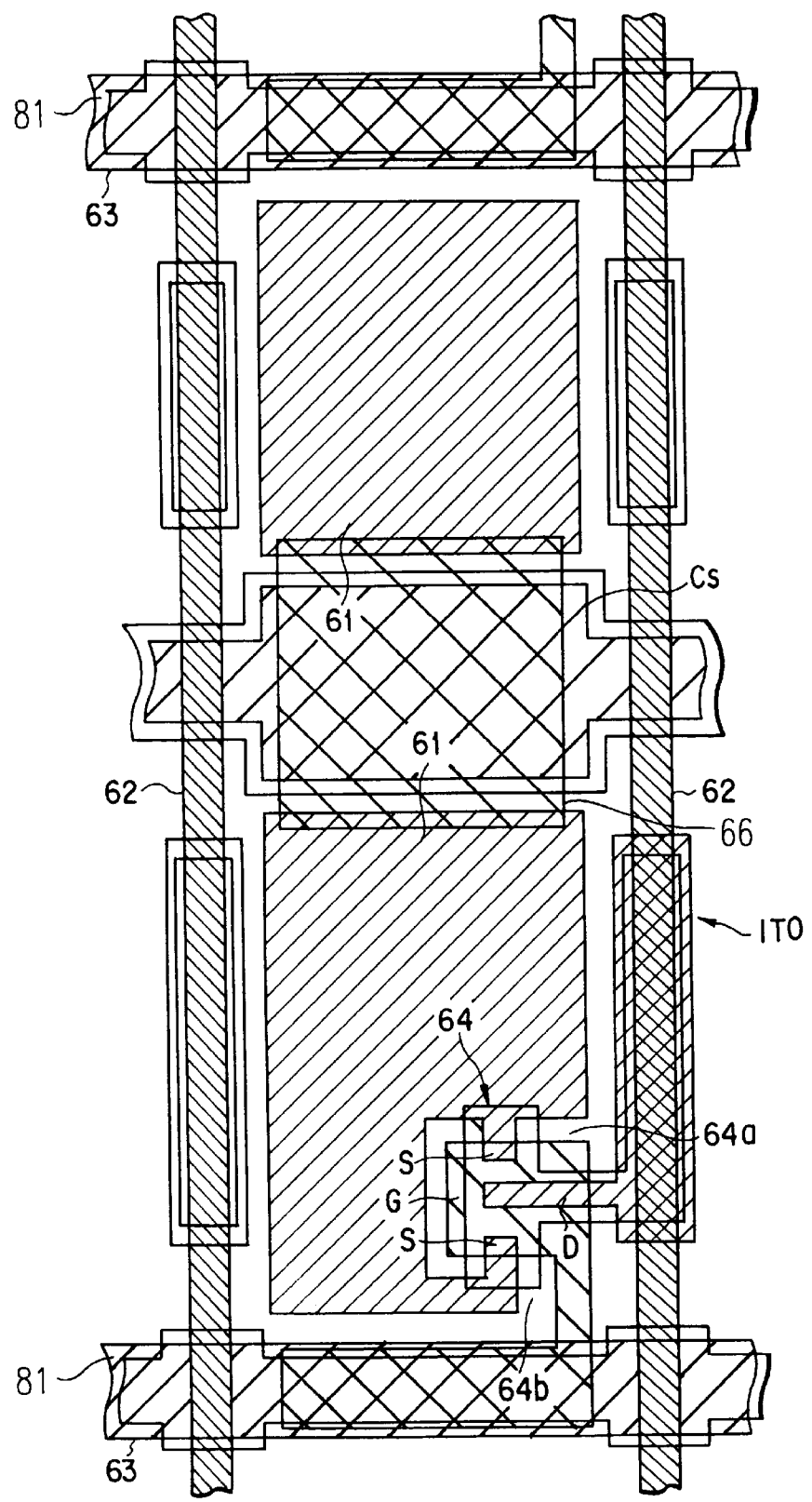
F I G. 21

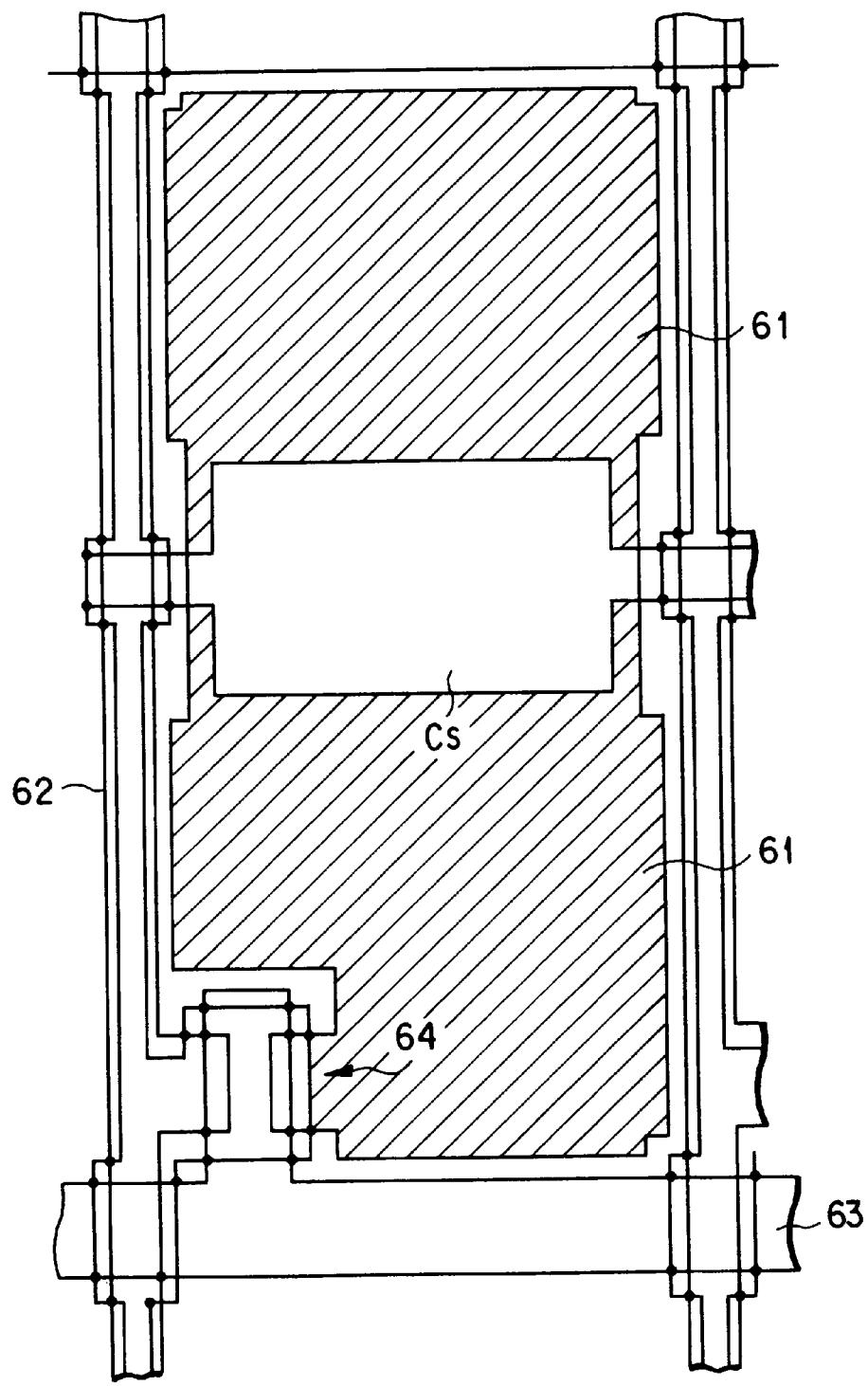
F I G. 26

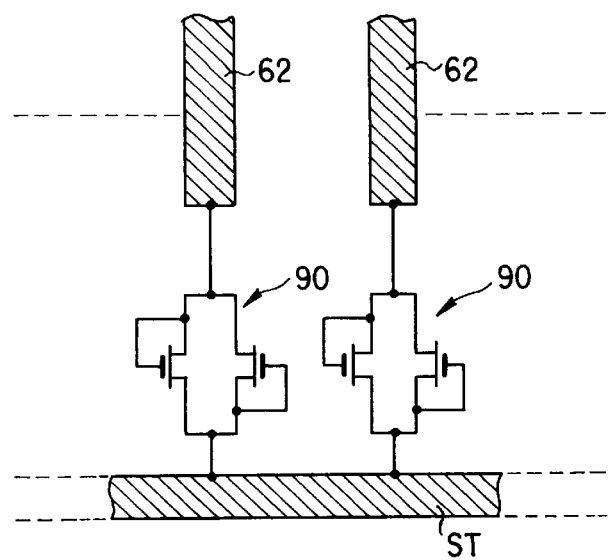
F I G. 27
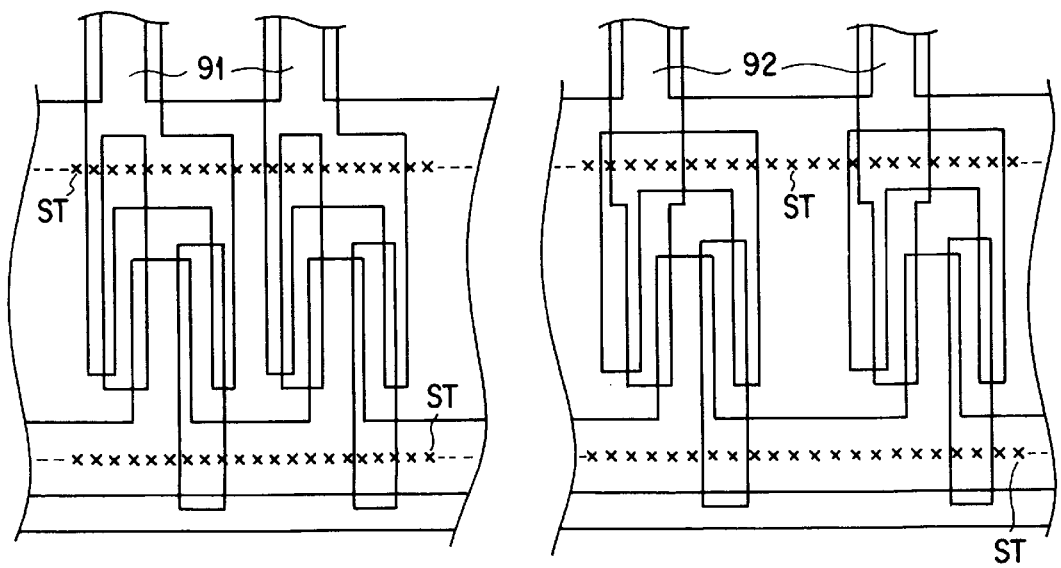
F I G. 28A  F I G. 28B

ACTIVE MATRIX LIQUID CRYSTAL PANEL HAVING AN ACTIVE LAYER AND AN INTERVENING LAYER FORMED OF A COMMON SEMICONDUCTOR FILM

BACKGROUND OF THE INVENTION

The present invention relates to an active matrix liquid crystal display and, more particularly, to an active matrix liquid crystal panel which reduces the number of steps of the manufacturing process for the panel and realizes a high yield at a low cost.

Display devices of, e.g., electroluminescence, light-emitting diode, plasma, and liquid crystal types have display units, which can be made low-profile, and are promising in application to display for a television set, a measurement equipment, an office equipment, a computer, and the like. Of these devices, a liquid crystal display with a TFT liquid crystal panel, having a matrix array using thin film transistors (TFTS) as switching elements, can realize full color display and low power consumption.

Materials for such a switching transistor are crystalline Si, polycrystalline Si, amorphous Si, CdSe, Te, CdS, and the like. Of these materials, particularly the polycrystalline and amorphous semiconductors can be processed by a thin film technique in a low-temperature process. For this reason, these semiconductors can be used as a material which forms the active matrix element of a switching transistor even on a substrate made of a material, such as glass, which must be processed at a relatively low temperature. By employing this technique, large-area liquid crystal displays can be mass-produced at a low cost.

FIGS. 31A to 31F show an example of a method of manufacturing a conventional active matrix liquid crystal display panel using an amorphous silicon (a-Si) film as an active layer.

First, an undercoat layer 102 consisting of, e.g., SiOx is formed by sputtering on a transparent insulating substrate 101 such as a glass substrate. A conductive layer consisting of a refractory metal such as Cr or an Mo—Ta alloy is formed on the undercoat layer 102. The refractory metal conductive layer is patterned to form a gate electrode 103 and a pad portion 104 serving as a lead-out portion (FIG. 31A; first mask step).

The gate electrode 103 and the pad portion 104 are covered with an insulating film 105 of, e.g., SiNx. After an a-Si film 106 is stacked as an active layer on the insulating film 105 at a position above the gate electrode, an n$^+$-type a-Si film 107 is further stacked as an ohmic-contact layer. These films are etched into a predetermined pattern (FIG. 31b; second mask step).

A transparent electrode film 108 consisting of, e.g., ITO and serving as a pixel electrode is formed into a predetermined pattern on the insulating film 105 (FIG. 31C; third mask step). Further, the insulating film 105 is removed at the lead-out portion of the gate electrode 103, e.g., the pad portion 104 by etching (FIG. 31D; fourth mask step).

A source electrode 109a and a drain electrode 109b are formed on the n$^+$-type a-Si film 107 with a predetermined distance therebetween. Using the source and drain electrodes 109a and 109b as part of a mask, the n$^+$-type a-Si film 107 between the source and drain electrodes 109a and 109b is removed by etching to form a TFT (FIG. 31E; fifth mask step). To improve the durability, a protection film 110 of, e.g., SiNx is deposited on the TFT. The protection film 110 is removed at the lead-out portion of the electrode such as the pad portion 104 (FIG. 31F; sixth mask step), completing the active matrix panel.

In the method of manufacturing an active matrix panel, the number of mask steps is as large as six, as described above, resulting in an increase in manufacturing cost. A low-cost active matrix panel cannot be obtained.

In removing the n$^+$-type a-Si film 107 by etching, the a-Si (amorphous silicon) film 106 is also etched, so that the a-Si film must be made thick. In general, an a-Si film having a thickness of about 200 to 300 nm is used. The film formation process takes a long time, the productivity is degraded, and management of the etching step with respect to the n$^+$-type a-Si film is complicated.

On the other hand, a method disclosed in Jpn. Pat. Appln. KOKOKU Publication No. 6-18215 is also available. According to this method, a gate electrode is selectively formed on an insulating substrate, part of the lead-out portion of the gate electrode is masked, and a gate insulating film, an a-Si film, an n$^+$-type a-Si film, and a metal film are continuously deposited. Then, the a-Si film, the n$^+$-type a-Si film, and the metal film are patterned into almost the same shape. A transparent conductive film is deposited on the entire surface. This transparent electrode is patterned into the wiring or interconnect shapes of source and drain electrodes also serving as pixel electrodes. The metal film and the n$^+$-type a-Si film are selectively removed using the transparent conductive film pattern as part of a mask, completing the active matrix liquid crystal display.

In the method of manufacturing an active matrix liquid crystal display, the gate insulating film, the a-Si film, the n$^+$-type a-Si film, and the metal film must be continuously deposited upon masking the gate contact electrode with the metal mask or the like. As a result, a film on the metal mask may peel off to greatly decreased the yield. Particularly when a large number of active matrix liquid crystal displays are cut from one substrate, a metal mask must be set at the central portion of the substrate, greatly decreasing the yield.

A method of lift-off using a resist or the like instead of a metal mask is another option. However, since the substrate temperature must be elevated in depositing a gate insulating film, an a-Si film, and an n$^+$-type a-Si film, a normal resist cannot be used. Even if the substrate temperature during deposition is lowered (up to 130° C., the film lifted off and the like may reattach to the substrate in the lift-off step, resulting in a decrease in yield.

SUMMARY OF THE INVENTION

It is therefore an object of the present invention to provide an active matrix liquid crystal panel which realizes a decrease in the number of active matrix panel manufacturing steps, and an increase in yield at a low cost.

According to a first aspect of the present invention, there is provided an active matrix liquid crystal panel having a plurality of pixels arrayed in a matrix format, comprising:

a plurality of signal lines and a plurality of address lines which are arranged in a grid;

a plurality of pixel electrodes arranged in correspondence with the pixels so as to be located at intersections of the signal lines and the address lines;

a counter electrode opposing the pixel electrodes;

a liquid crystal layer arranged between the pixel electrodes and the counter electrode;

a plurality of transistors respectively arranged adjacent to the pixel electrodes, each transistor having a semiconductor active layer constituting a pair of source and drain regions and a channel region, a pair of source and drain electrodes for respectively connecting the source and drain regions to a corresponding pixel electrode and a corresponding signal line, and a gate electrode opposing the channel region via a gate insulating layer and connected to a corresponding address line; and a plurality of auxiliary capacitances respectively arranged adjacent to the pixel electrodes, each auxiliary capacitance having a pair of upper and lower electrodes electrically connected substantially in parallel to a corresponding pair of pixel and counter electrodes, a dielectric layer sandwiched between the upper and lower electrodes, and a semiconductor intervening layer sandwiched between the dielectric layer and the upper electrode, wherein the active layer and the intervening layer respectively comprise portions formed of a common semiconductor film, the active layer and the gate insulating layer have substantially a same plan-view contour at a position where the source and drain electrodes overlap with the gate electrode, and the intervening layer and the dielectric layer have substantially a same plan-view contour at a position where the upper electrode overlaps with the lower electrode.

According to a second aspect of the present invention, there is provided an active matrix liquid crystal panel having a plurality of pixels arrayed in a matrix format, comprising:

a plurality of signal lines and a plurality of address lines which are arranged in a grid;

a plurality of pixel electrodes arranged in correspondence with the pixels so as to be located at intersections of the signal lines and the address lines;

a counter electrode opposing the pixel electrodes;

a liquid crystal layer arranged between the pixel electrodes and the counter electrode; and a plurality of transistors respectively arranged adjacent to the pixel electrodes, each transistor having a semiconductor active layer constituting a pair of source and drain regions and a channel region, a pair of source and drain electrodes for respectively connecting the source and drain regions to a corresponding pixel electrode and a corresponding signal line, and a gate electrode opposing the channel region via a gate insulating layer and connected to a corresponding address line, wherein the gate electrode and the signal line respectively comprise portions formed of a common lower-level conductive film arranged on an insulating surface of a support substrate, the source and drain electrodes and the address line respectively comprise portions formed of a common middle-level conductive film, and the pixel electrode comprises a portion formed of an upper-level conductive film, the signal line being smaller in width than the address line at the intersections.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are a block diagram showing the main component of an active matrix liquid crystal display according to the present invention, and a diagram showing the equivalent circuit of the liquid crystal panel;

FIGS. 2A to 2F are left, middle, and right sectional views taken along lines VA, VB, and VC of FIG. 5, respectively showing the steps in a method of manufacturing a liquid crystal panel according to an embodiment of the present invention;

FIGS. 6 to 9 are plan views respectively showing one pixel of a liquid crystal panel according to different modifications of the embodiment shown in FIGS. 2A to 2F;

FIGS. 10A to 10C are sectional views respectively showing the steps in a method of manufacturing a liquid crystal panel according to another embodiment of the present invention;

FIGS. 11A, 11B, 12A, 12B, 13A, and 13B are sectional views for explaining measures against a degradation in performance of the liquid crystal panel according to the present invention;

FIG. 14 is a plan view showing one pixel of a liquid crystal panel according to still another embodiment of the present invention;

FIGS. 18A, 18B, 19A, 19B, 20A, and 20B are plan views and sectional views respectively showing one pixel of a liquid crystal panel according to three modifications wherein an auxiliary capacitance is incorporated in the embodiment shown in FIG. 14;

FIGS. 21 and 22 are plan views respectively showing one pixel of a liquid crystal panel according to two modifications wherein an auxiliary capacitance is incorporated in the embodiment shown in FIG. 14 and an improvement is made in respect of a measure against the punch-through voltage;

FIG. 26 is a plan view showing one pixel of the liquid crystal panel according to the embodiment shown in FIGS. 23A to 23C;

FIG. 27 is a diagram showing the equivalent circuit of a short ring using a TFT in a liquid crystal panel according to still another embodiment of the present invention;

FIGS. 28A and 28B are views respectively showing the states of the short ring on the signal and address line sides;

DETAILED DESCRIPTION OF THE INVENTION

Figure 3A:
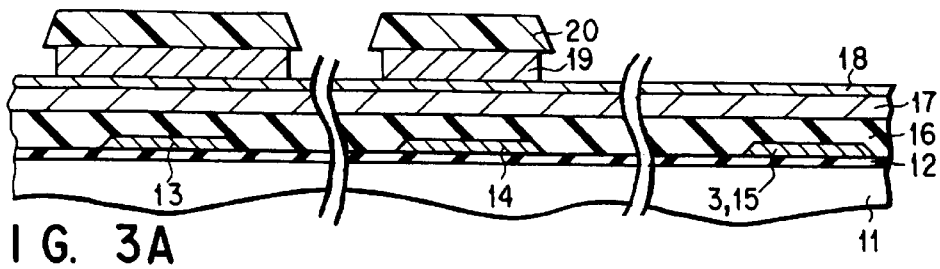
FIGS. 3A to 3C are left, middle, and right sectional views taken along lines VA, VB, and VC of FIG. 5, respectively showing the steps in a modification of the manufacturing method shown in FIGS. 2A to 2F.

FIG. 1A is a block diagram showing the arrangement of the main part of an active matrix liquid crystal display according to the present invention, and FIG. 1B is a diagram showing the equivalent circuit of this liquid crystal panel.

A liquid crystal panel 5 has a plurality of small pixels arrayed in a matrix format such that they are positioned at the intersections of a plurality of signal lines 2 (Lb1, Lb2, . . . , Lbn) and a plurality of address lines 3 (La1, La2, . . . , Lam) which are arranged in a grid. An address line driver 7 is disposed to transfer an address signal to the address lines. A signal line driver 6 is disposed to transfer a display signal to the signal lines in synchronism with the address signal. Further, a controller 8 is disposed to control the signal line driver and the address line driver.

A plurality of pixel electrodes 1 electrically independent from each other are arranged in correspondence with the respective pixels. One common electrode or counter electrodes CE are arranged to oppose the pixel electrodes 1. A liquid crystal layer LC is arranged between the pixel electrodes 1 and the counter electrodes CE. Each pixel has a switch SW, and its pixel electrode 1 is connected to a corresponding signal line 2 via the switch SW. The counter electrode CE is connected to a common electrode $V_{COM}$. Each pixel is connected to an auxiliary capacitance Cs of a capacitor, which can hold the display state of each pixel.

Each switch SW is constituted by a TFT (thin film transistor). The source, drain, and gate of the TFT are connected to the pixel electrode 1, the signal line 2, and the address line 3, respectively. That is, the switch SW is ON/OFF-controlled by an address signal transferred via the address line. The address line driver 7 sequentially supplies an address signal or a driving signal to the address lines La1, La2, . . . , Lam to drive and control the switches SW of the respective pixels in units of a row.

In the ON state, each switch SW passes a display signal or a pixel driving voltage transferred via the signal line to the pixel electrode 1. In accordance with the voltage across the pixel electrode 1 and the counter electrode CE, the state of the liquid crystal layer LC changes, thereby display-driving each pixel.

FIGS. 2A to 2F are sectional views respectively showing the steps of manufacturing an active matrix liquid crystal display according to an embodiment of the present invention.

First, a transparent insulating substrate 11 such as a glass substrate is coated with an SiOx film 12 by sputtering, a CVD method, or the like. A refractory metal such as Cr or an Mo—Ta alloy is deposited and then patterned to form a gate electrode 13, a lower electrode 14 for an auxiliary capacitance, an address line 3, and an address line contact electrode 15 (FIG. 2A; first mask step).

On the structure having these electrodes 13, 14, and 15 and the wiring layer 3 formed thereon, an SiNx film 16, an a-Si film 17, and an n$^+$-type a-Si film 18 are respectively deposited to 300 nm, 300 nm, and 50 nm by a plasma CVD method without breaking the vacuum. To prevent an interlayer short circuit caused by a pinhole and the like, the SiNx film 16 may be deposited in two steps. The film qualities of the upper and lower SiNx layers may be different from each other.

After a metal film 19 consisting of, e.g., Mo is deposited by sputtering, a resist pattern 20 is formed. Using the resist pattern 20 as a mask, the metal film 19 is patterned (FIG. 2B). The patterned metal film 19 includes the pattern of a region for forming a thin film transistor and an auxiliary capacitance and the pattern of the signal line 2 (second mask step).

With the resist pattern 20 being left, the n$^+$-type a-Si film 18, the a-Si film 17, and the SiNx film 16 as a gate insulating film are patterned into the same shape. This state of having the same shape or plan-view contour is substantially maintained even in the finished display. At this time, the n$^+$-type a-Si film 18, the a-Si film 17, and the SiNx film 16 as the gate insulating film on the address line 3 and the address line contact electrode 15 around the pixel portion are also removed by etching. As a result, the wiring layer 3 and the electrode 15 are exposed. Thereafter, the resist pattern is removed (FIG. 2C).

Next, a 150 nm-think transparent conductive film 21 of, e.g., ITO is formed by sputtering. The transparent conductive film 21 is patterned into the shape of the pixel electrode 1 by using a resist pattern 22 as a mask (FIG. 2D; third mask step). At this time, the transparent conductive film 21 between the source and drain of the thin film transistor is removed. The transparent conductive film 21 is left on the pattern of the address line 3 consisting of the refractory metal and the pattern of the signal line 2 made of the metal film 19.

Parts of the Mo metal film 19 and the n$^+$-type a-Si film 18 between the source and drain of the thin film transistor are removed (FIG. 2E). At this time, the resist pattern is left on the pixel electrode 1. Finally, the resist pattern 22 is removed (FIG. 2F).

By the above three mask steps, the active matrix liquid crystal display can be obtained.

The main steps of the above manufacturing process will be described below. In the step of continuously patterning the metal film 19 consisting of, e.g., Mo, the n$^+$-type a-Si film 18, the a-Si film 17, and the SiNx film 16 as a gate insulating film, the resist is first processed into a predetermined shape by photolithography. By using the obtained resist pattern 20 as a mask, the uppermost Mo layer is etched by a solution mixture of phosphoric acid, acetic acid, and nitric acid. At this time, it is preferable to adjust the etching rate so as to perform side etching from the resist end by about 1 μm.

Next, with the resist pattern 20 being left, the structure from the n⁺-type a-Si film 18 to the SiNx film 16 is etched by reactive ion etching (RIE) using a CF₄- or SF₆-based gas as a main component. At this time, it is preferable to set the etching pressure to 5 Pa or less so as not to cause side etching from the resist edge. Further, to completely prevent side etching, CHF₃ or H₂ may be preferably added to the etching gas so that side wall deposition is utilized. When the end face of the structure from the n⁺-type a-Si film 18 to the SiNx film 16 is to be tapered, O₂ or the like is added in the etching gas, and the structure is etched while ashing back the resist.

Figure 3B:
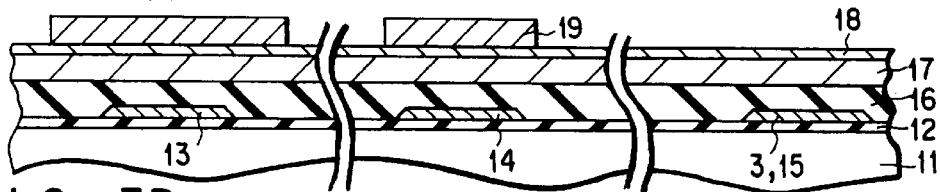
Figure 3C:
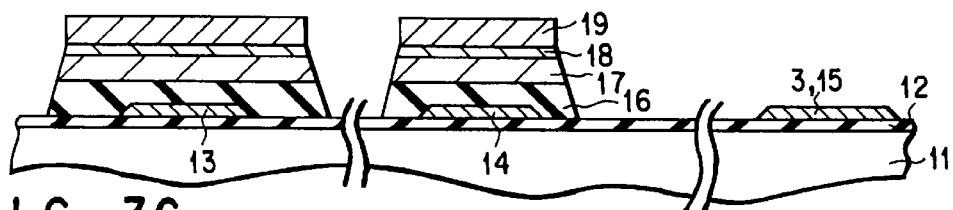

In the embodiment shown in FIGS. 2A to 2F, the structure from the n⁺-type a-Si film 18 to the SiNx film 16 is etched with the resist pattern 20 being left. However, the resist pattern 20 changed in quality by RIE may not completely come off in a resist removing step to leave residue which leads to a defect. To avoid this, it is possible to peel and remove the resist pattern 20 after patterning the uppermost Mo film 19, and etch the structure from the n⁺-type a-Si film 18 to the SiNx film 16 by using the Mo film pattern 19 as a mask, as shown in FIGS. 3A to 3C.

At this time, to prevent the metal film from being etched by RIE, Cr, Ti, and the like may be used as a metal. Alternatively, it is also possible to start the etching step with respect to the structure from the n⁺-type a-Si film 18 to the SiNx film 16 with the resist pattern 20 being left, add O₂ in the etching gas for, e.g., RIE, and simultaneously remove the resist pattern 20 by ashing during etching.

In the embodiment shown in FIGS. 2A to 2F, the transparent conductive film 21 is patterned into the shape of the pixel electrode 1, and the metal film 19 and the n⁺-type a-Si film 18 are selectively removed using the pixel electrode as part of a mask. In this step, the resist applied to the ITO film 21 is first processed into a predetermined shape by photolithography, and the ITO film is etched with a hydrochloric acid- or aqua regia-based etchant by using the obtained resist pattern 22 as a mask.

Subsequently, the Mo film 19 is removed by etching with a solution mixture of phosphoric acid, acetic acid, and nitric acid. With the resist pattern 22 being left, the n⁺-type a-Si film 18 is etched by RIE using a CF₄-based gas as a main component. At this time, due to the manufacturing limitation, the a-Si film 17 is etched by about 50 nm to end the etching. According to the above method, in etching the Mo film 19, the Mo film 19 is side-etched more than the end portion of the ITO film 21. By adjusting the aqua regia-based etchant, the ITO film 21 and the Mo film 19 can be continuously etched into a tapered shape. Alternatively, the Mo film 19 and the n⁺-type a-Si film 18 may be continuously etched by RIE.

Figure 4A:
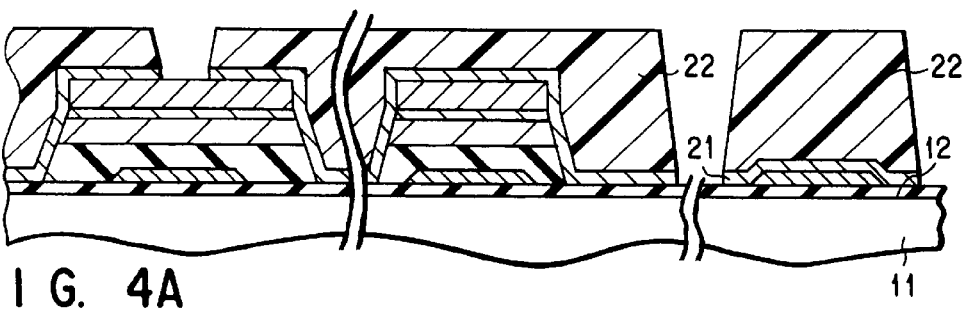
FIGS. 4A to 4C are left, middle, and right sectional views taken along lines VA, VB, and VC of FIG. 5, respectively showing the steps in another modification of the manufacturing method shown in FIGS. 2A to 2F.
Figure 4B:
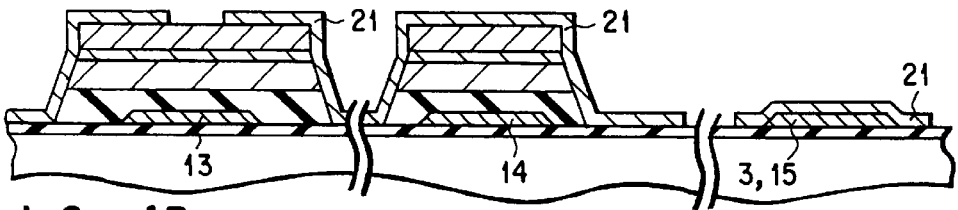
Figure 4C:
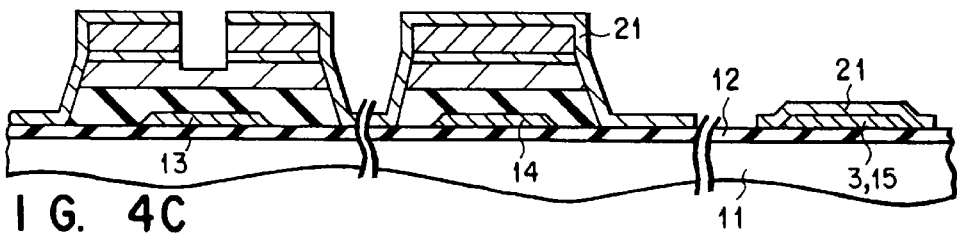

In the embodiment shown in FIGS. 2A to 2F, the resist pattern 22 is left until the n⁺-type a-Si film 18 is etched. However, similar to the etching process with respect to the structure from the Mo film 19 to the SiNx film 16, it is also possible to remove the resist pattern 22 after etching the ITO film 21, and perform subsequent etching by using the ITO film 21 as a mask, as shown in FIGS. 4A to 4C. Alternatively, the resist pattern 22 may be removed after etching the Mo film 19.

Figure 5:
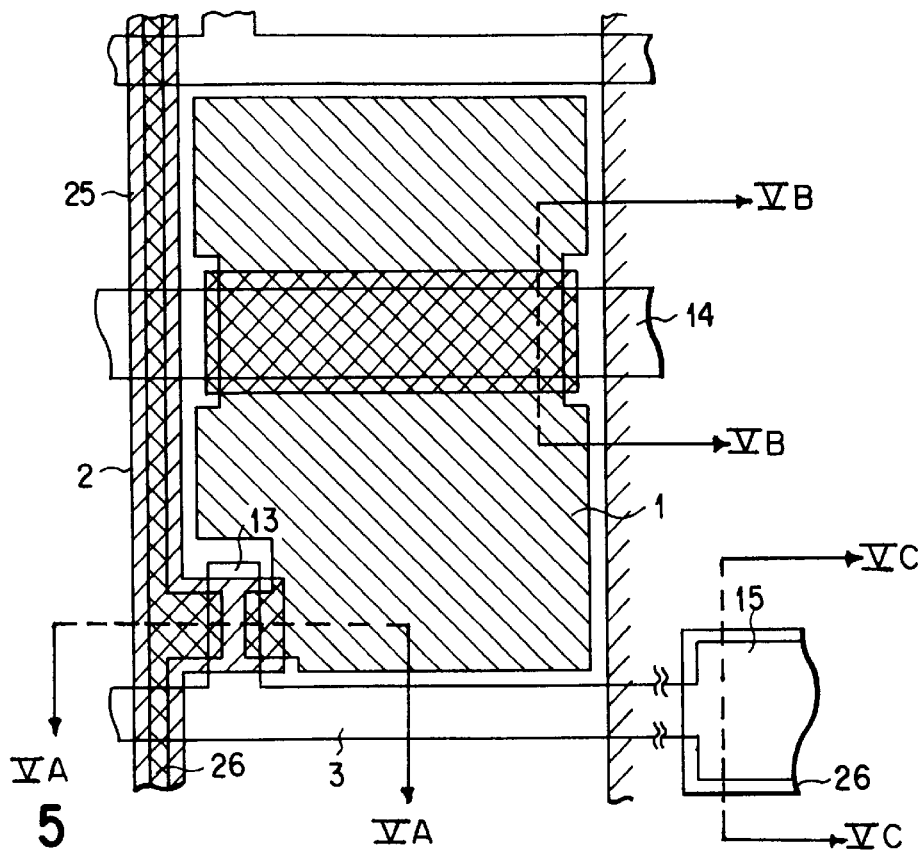
FIG. 5 is a plan view showing one pixel of the liquid crystal panel according to the embodiment shown in FIGS. 2A to 2F.

FIG. 5 shows one pixel of the liquid crystal panel formed by the manufacturing method shown in FIGS. 2A to 2F, and FIGS. 6, 7, and 8 respectively show one pixel of a liquid crystal panel according to different modifications. In FIGS. 5, 6, 7, and 8, reference numeral 25 denotes a signal line mask pattern; 26, a pixel electrode mask pattern.

Figure 6:
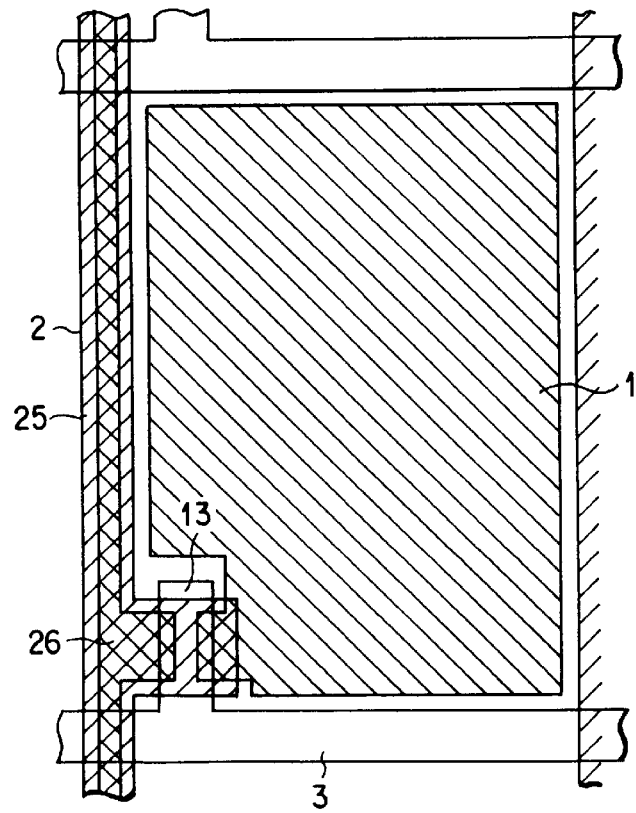

Referring to FIG. 5, the upper electrode 19 of the auxiliary capacitance directly contacts the transparent conductive film 21 constituting the pixel electrode 1. FIG. 6 shows a structure having no auxiliary capacitance electrode 14, and FIG. 7 shows a structure having the auxiliary capacitance electrode 14 integral with the auxiliary capacitance electrode 14.

Figure 7:
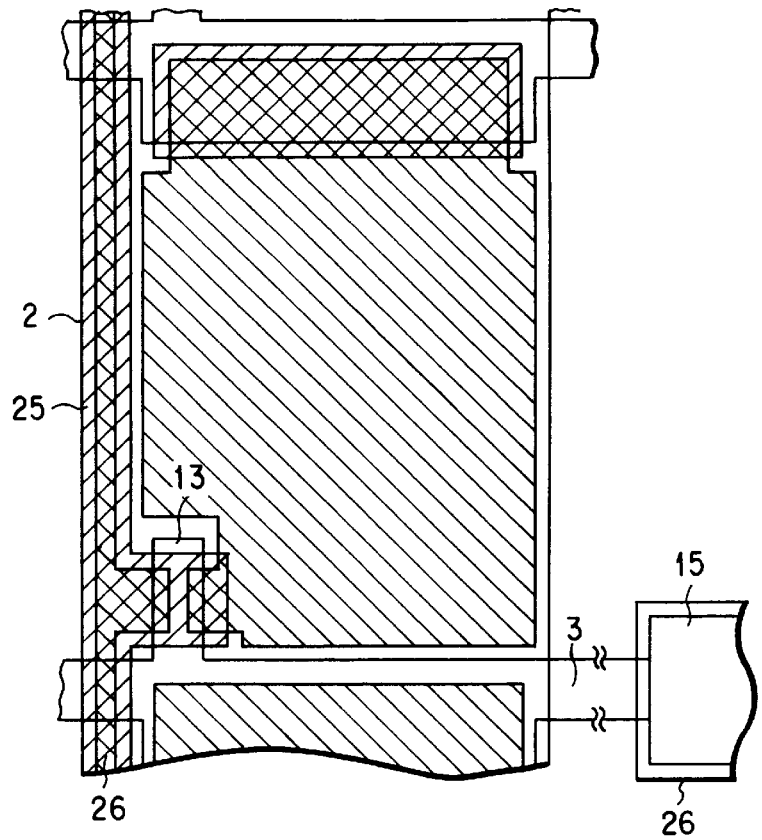
Figure 8:
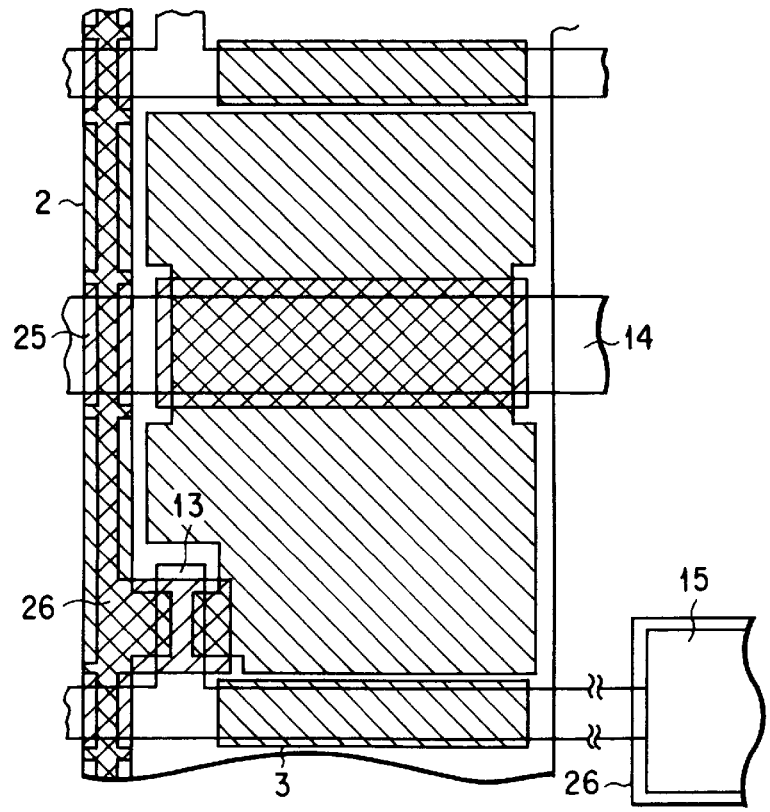

As shown in FIG. 7, the mask pattern of the ITO film must be made narrower than the mask pattern 25 of the signal line at the intersection of the signal line 2 and the address line 3. However, as shown in FIG. 8, the mask pattern 26 may be formed to cover the signal line pattern 25 in a region except for the intersection. With this structure, the diffusion of contaminants from the signal line material into the liquid crystal can be reduced. Further, the ITO pattern can be left on the address line 3. In this case, as shown in FIG. 9, a signal line metal 27 can be left on the address line 3 to decrease the resistance of the gate line.

When the gate electrode is made of a material such as Mo—Ta, which is slightly etched in etching the n⁺-type a-Si film 18, the following problems may arise. That is, the etching rate of the n⁺-type a-Si film 18 may vary due to reaction products in etching the Mo—Ta film 19, or the transistor characteristics may vary due to the reaction products that reattach to the back channel portion. The structure having the ITO pattern remaining on the gate electrode is also effective as a measure against these problems.

Next, another embodiment of the present invention will be described. This embodiment has as its object to decrease the resistance value of the signal line, and uses a multilayered film containing Al as a metal for forming a signal line 2 and the like. The steps in this embodiment are basically the same as those in the embodiment shown in FIGS. 2A to 2F except that the step of etching a metal film and an ITO film is changed. This step will be explained below.

In this embodiment, a metal film 19 made of a multilayer of Mo, Al, and Mo is stacked by sputtering. The film thicknesses are 50 nm, 300 nm, and 50 nm in order from the upper film. The Mo/Al/Mo metal film 19, an n⁺-type a-Si film 18, an a-Si film 17, and an SiNx film 16 as a gate insulating film are continuously etched and patterned into almost the same shape. In this step, the uppermost Mo/Al/Mo film 19 is first etched by a solution mixture of phosphoric acid, acetic acid, and nitric acid.

A transparent conductive film is patterned into the shape of a pixel electrode, and the metal film 19 and the n⁺-type a-Si film 18 are selectively removed using the pixel electrode as part of a mask. In this step, an ITO film is first etched by RIE using methane, alcohol, or hydrogen iodide as a main component. In wet etching using an aqua regia-based solution, residues of the ITO film and the like are produced depending on the electrical potential in the solution for Al and ITO interfering with etching. Subsequently, the Mo/Al/Mo film 19 is removed by etching using a solution mixture of phosphoric acid, acetic acid, and nitric acid. Further, the n⁺-type a-Si film 18 is etched by RIE using a CF₄-based gas as a main component with the same resist. At this time, due to the manufacturing limitation the a-Si film is etched by about 50 nm to end the etching.

According to the method of this embodiment, in etching the Mo/Al/Mo film 19, the Mo/Al/Mo film 19 is side-etched more than the end portion of an ITO film 21. For this reason, the Mo/Al/Mo film 19 can be anisotropically etched by RIE using a gas containing CF₄, Cl₂, or the like as a main component. Further in this case, the n⁺-type a-Si film can be continuously etched.

In this manner, since the ITO film is dry-etched by RIE, Al and the like can be used for the metal film 19. Also when an Mo/Al film is used for a gate electrode 13 and an address line 3, it is desirable to similarly dry-etch the ITO film by RIE. Therefore, according to this embodiment, an active matrix liquid crystal display wherein the signal delay is eliminated by decreasing the wiring resistance can be obtained.

FIGS. 10A to 10C are sectional views respectively showing the steps of manufacturing an active matrix liquid crystal display according to still another embodiment of the present invention. This embodiment is characterized in that SiOx is used for a gate insulating film. SiNx suffers the problems of a low deposition rate by CVD and poor productivity. In the above embodiment shown in FIGS. 2A to 2F, PE-CVD is used, and the deposition rate of SiNx is 10 nm/min with this method. Compared to SiNx, SiOx has a deposition rate as high as 30 nm/min even for the same PE-CVD method. Further, the deposition rate of SiOx in atmospheric pressure CVD is more than an order of magnitude higher than that of SiNx in PE-CVD. This embodiment will be described below with reference to FIGS. 10A to 10C.

First, a transparent insulating substrate 31 such as a glass substrate is coated with an $Al_2O_3$ film 32 by sputtering or the like. A refractory metal such as Cr or an Mo—Ta alloy is deposited and patterned to form gate electrodes 33 (FIG. 10A). An SiOx film 34, an a-Si film 35, and an $n^+$-type a-Si film 36 are sequentially deposited to thicknesses of 300 nm, 300 nm, and 30 nm on each gate electrode 33 by plasma CVD without breaking the vacuum. The SiOx film 34 may be deposited by, e.g., 150 nm in each of two steps, as a matter of course. To improve the characteristics of the thin film transistor, SiNx may be used for a portion in contact with the upper a-Si film 35. Further, an SiNx film may be formed to have a thickness of about 50 nm on the SiOx film 34.

Next, the $n^+$-type a-Si film 36 consisting of, e.g., Mo is deposited by sputtering. An Mo metal film 37, the $n^+$-type a-Si film 36, the a-Si film 35, and the SiOx film 34 as a gate insulating film are patterned using the same mask (FIG. 10B). A transparent conductive film 38 of, e.g., ITO is deposited to 150 nm by sputtering and patterned into the shape of a pixel electrode. At this time, a portion of the Mo metal film 37 between the source and drain of the thin film transistor, and the $n^+$-type a-Si film 36 therebelow are selectively removed using the pixel electrode as part of a mask (FIG. 10C).

By the above three mask steps, the active matrix liquid crystal display can be obtained. The manufacturing steps are almost the same as those in the embodiment shown in FIGS. 2A to 2F except that $Al_2O_3$ is used as a coating material below the gate electrode. This is because, if SiOx is used, etching cannot be stopped on the coating material surface below the gate electrode in etching SiOx as a gate insulating film. Note that the coating material below the gate electrode can be MgF, CaF, and the like as far as the transparent insulating film has durability against a $CF_4$- or $SF_6$-based etching gas. The structure from the $n^+$-type a-Si film 36 to the SiOx film 34 can be etched by reactive ion etching (RIE) using a $CF_4$- or $SF_6$-based gas as a main component.

In the above three embodiments, since no protection film consisting of, e.g., SiNx is formed on the active matrix liquid crystal display, unlike in the prior art, the active matrix liquid crystal display can be formed by three mask steps. An LCD using such an active matrix liquid crystal display was examined under specific conditions such as a high temperature and a high humidity. As a result, it was found that the performance of the LCD was degraded. For example, after continuous use at 80° C. for 1,000 hours, the screen undesirably became whitish. The characteristics of the active matrix liquid crystal display having such a problem were examined to find that the OFF resistance of the thin film transistor decreased. The present inventors have found against this problem, which will be explained below.

According to the first measure, the structure upon etching an $n^+$-type a-Si film is processed by RIE using a gas of $O_2$, $N_2$, or the like in the embodiment shown in FIGS. 2A to 2F. The RIE processing may be performed before or after removing the resist pattern. In this method, the structure may be exposed in a plasma, instead of performing RIE.

The second measure is a method of anodizing an $n^+$-type a-Si film 46 in a tartaric acid solution without etching the $n^+$-type a-Si film. FIGS. 11A and 11B show the section of a thin film transistor for explaining this process. A gate electrode 43 and a gate insulating film 44 are formed on an insulating substrate 41 coated with an insulating coating film 42. An a-Si film 45, an $n^+$-type a-Si film 46, and a metal film 47 are further formed on the gate insulating film 44, and covered with a transparent conductive film 48. The metal film 47 for a signal line consists of Al. In this method, since the film thickness of an anodized film 49 can be controlled by the formation voltage, the a-Si film 45 can be made thin. According to an experiment, even if the a-Si film 45 was made as thin as 300 to 100 nm, an active matrix liquid crystal display could be formed with good reproducibility.

The thickness of the anodized film 49 is set to 30 to 100 nm, which is larger than that of the $n^+$-type a-Si film 46. The anodizing solution may be any material other than the above solution, and Ti, Cr, and the like may be used for a signal line in accordance with the solution to be used. Anodizing may be performed with the resist pattern being left on the ITO film 48.

The third measure is also a method of increasing the resistance of the exposed portion of the $n^+$-type a-Si film 46 by ion implantation of N or O without etching the $n^+$-type a-Si film 46. The ion implantation conditions were as follows: the gas to be introduced into an ion source was $O_2$ or $N_2$ gas; the acceleration voltage was 15 to 50 kV; and the ion dose was $10^{16}$ to $10^{18}/cm^2$. The mass spectrometry was not performed.

FIGS. 12A and 12B show the sectional structure of a thin film transistor when $N_2$ is used as an ion source gas. As is apparent from FIGS. 12A and 12B, an SiNx layer 50 is formed at the exposed portion of the $n^+$-type a-Si film 46. Also in this measure, since the ion implantation depth can be controlled by the acceleration voltage, the a-Si film 45 can be made thin. According to an experiment, a sufficient characteristic can be obtained when the thickness of the a-Si film 45 is 300 to 80 nm and that of the $n^+$-type a-Si film 46 is 50 to 10 nm. To perform uniform doping in the direction of film thickness, the acceleration voltage may be changed during ion implantation. The direction to change the voltage is preferably from high acceleration to low acceleration. As a result of an examination of the distribution of implanted N in the depth direction, it was found that N was also implanted in the a-Si film 45.

The fourth measure is similar to the third measure. In this measure, $B_2H_6$ is used as the gas to be introduced into an ion source, B as a p-type dopant is implanted in the $n^+$-type a-Si film 46 to increase the resistance. At this time, it is found that B is also implanted in the a-Si film 45 to a certain degree. The acceleration voltage was 15 to 50 kV, and the dose was $10^{15}$ to $10^{18}/cm^2$. FIGS. 13A and 13B show the sectional structure of a thin film transistor. As is apparent from FIGS. 13A and 13B, a boron-doped high-resistance layer 51 is formed at the exposed portion of the $n^+$-type a-Si film 46.

From the above measures, the cause of the increase in OFF resistance of the thin film transistor is considered to be a decrease in resistance of the back channel portion of the thin film transistor. Although the exact cause has not been ascertained, since the resistance value and the like of a high-quality semiconductor generally change upon slight changes in composition or variations in potential, it is assessed that the properties of a semiconductor must be brought down to ensure a high reliability. In the first to third measures, it is estimated that the surface is nitrided or oxidized, and the interface is greatly damaged to degrade the properties of the semiconductor. In the fourth measure, it is assumed that donors and acceptors cancel out each other to increase the resistance, and the semiconductor is converted to p-type to some extent. A hole current flowing through the p-type portion is blocked by the $n^+$-type a-Si film 46. In addition, although the surface converted to p-type is ion-damaged, the back channel damage hardly affects the channel side, compared to the intrinsic a-Si film 45.

If a protection film is formed together with the above measures, the reliability is apparently further improved.

Note that the present invention can also be applied to a reflection type liquid crystal display having a pixel electrode made of a metal, in addition to the above active matrix liquid crystal display.

According to the above methods of the present invention, since a metal film, a thin semiconductor film, and an insulating film are continuously patterned into almost the same shape to expose an address line and an electrode pad, the number of mask steps can be greatly decreased. Therefore, a low-cost active matrix liquid crystal display can be obtained with a high yield and good productivity.

In addition, the auxiliary capacitance is formed in the step common to the thin film transistor, and both the SiNx film 16 as an insulating film and the a-Si film 17 are left between the upper and lower electrodes of the auxiliary capacitance to prevent occurrence of a short circuit between the upper and lower electrodes. That is, since the SiNx film 16 has a large number of pinholes, if the upper and lower electrodes are separated by only the SiNx film 16, a short circuit easily forms via the pinholes. However, if the a-Si film 17 as a high-resistance film is formed, short-circuiting between the upper and lower electrodes can be prevented in advance. Further, with a-Si film 17 being left, it is possible to prevent pinholes from being formed at defects or weak points of the SiNx film 16 thereunder. Conventionally, the pinholes are inevitably formed when the a-Si film 17 is removed by etching.

In the above manufacturing methods, however, a precaution must be taken in etching ITO. That is, in etching ITO, selective etching is done so as not to influence the gate electrode. For this reason, when a hydrochloric acid-based etchant as a normal ITO etchant is used, the gate electrode materials to be selected are limited.

Since a metal such as low-cost, low-resistance Al (aluminum) has no resistance to hydrochloric acid, Ta, Cr, an Mo—Ta alloy, and the like, which have resistance to hydrochloric acid, are normally used as a gate electrode material. However, the electrical resistance values of these materials are higher than that of Al. For this reason, the resistance value of the gate line cannot be decreased in a liquid crystal panel using a metal such as Ta, Cr, and an Mo—Ta alloy.

Due to this problem, the image quality poses a problem in realizing a large-screen, high-definition liquid crystal panel. This problem becomes serious when the widths of the address and signal lines must be reduced in increasing the screen size and definition of the liquid crystal panel. Further in this case, the difference in length between long and short lines to pad portions becomes large. For this reason, the signal is delayed in propagating through the line, and particularly a delay of a gate pulse as a high-speed pulse on the address line cannot be avoided, resulting in a degradation in display uniformity.

More specifically, with the increases in screen size and definition of the liquid crystal panel, the pixel becomes very small, and the number of pixels greatly increases. In this structure, the widths of the gate line (row address line) and the signal line shrink, and the difference in length between the longest and shortest lines to pad portions becomes large. If the electrical resistance of the line is high under these conditions, a signal delay takes place, and the difference between signal delays becomes large among pixels at different positions. For this reason, the display on the screen is nonuniform.

In these structures, each intersection of the gate and signal lines is constituted as shown in FIGS. 16A to 16D. If the uppermost ITO pattern is not formed into a design pattern but spreads like a region Aabn, the gate line (address line) and the signal line short-circuit in this region Aabn, resulting in a critical line defect.

FIG. 14 is a plan view showing an active matrix liquid crystal panel according to still another embodiment of the present invention in terms of this viewpoint. In FIG. 14, reference numerals 61 denotes a pixel electrode; 62, a signal line; 63, an address line (gate line); and 64, a TFT. Reference symbols S, D, and G denote the source, drain, and gate of the TFT 64, respectively. Reference numeral Ai is an a-Si island-like region constituting the TFT 64. In this liquid crystal panel, the signal line 62 is made narrower than the address line 63.

The characteristic features of this embodiment are that the signal line 62 is made narrower than the address line 63, and that the address line 63 is arranged on the upper side and the signal line 62 is arranged on the lower side. This arrangement is determined in consideration of the manufacturing process of arranging an ITO film on the surface side, i.e., the upper side. That is, the upper wiring is used for the address line to decrease the electrical resistance value. The upper wiring is entitled to have a free design rule in relation to its thickness, step shape or the like, as compared to the lower wiring. In addition, the crossing distance of the wide address line 63 across the narrow signal line is shortened to narrow a region wherein ITO residues may attach to the signal line 62 in etching the ITO film into a wiring pattern. With this arrangement, the probability of occurrence of a short circuit can be minimized. Further, to decrease the cost, an active matrix liquid crystal panel is manufactured also in three mask steps.

A manufacturing method according to this embodiment is similar to that in FIGS. 2A to 2F. The manufacturing method of this embodiment will be described with reference to FIGS. 15A to 15F.

Figure 15A:
FIGS. 15A to 15F are sectional views respectively showing the steps in a method of manufacturing the liquid crystal panel according to the embodiment shown in FIG. 14.

First, a transparent insulating substrate 71 such as a glass substrate is coated with SiOx by sputtering, a CVD method, or the like to form an undercoat layer 72. A refractory metal such as Cr or an Mo—Ta alloy is deposited on the undercoat layer 72. A resist pattern is formed on this refractory metal, and the refractory metal is patterned using this resist pattern as a mask to form a gate electrode G and a signal line 62 (FIG. 15A; first mask step).

SiNx, a-Si, and n⁺-type a-Si are respectively deposited to 300 nm, 250 nm, and 30 nm by plasma CVD on the transparent insulating substrate 71 including the gate electrode G and the signal line 62. With this process, three films, i.e., an SiNx film 76, an a-Si film 77, and an n⁺-type a-Si film 78 are formed on the entire surface of the transparent insulating substrate 71 including the gate G and the signal line 62. To prevent an interlayer short circuit from being formed by a pinhole and the like, SiNx may be deposited in two steps. The film qualities of the upper and lower SiNx films may be different from each other.

Figure 15B:
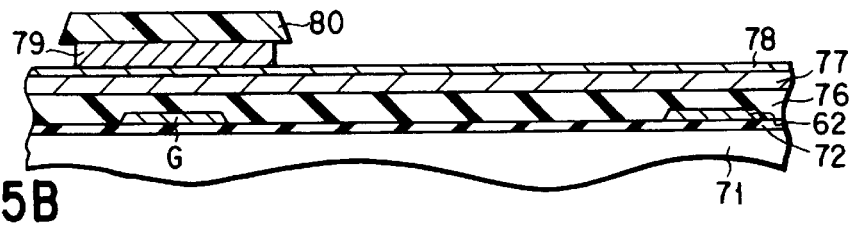

A metal film 79 consisting of, e.g., Mo is deposited on the n⁺-type a-Si film 78 by sputtering. A resist is applied to the metal film 79 and patterned to form a predetermined resist pattern 80. The metal film 79 is removed by etching using the resist pattern 80 (FIG. 15B). At this time, the pattern of the Mo film (metal film 79) includes the patterns of an address line 63 and the source and drain electrodes of a TFT 64 (second mask step).

Figure 15C:
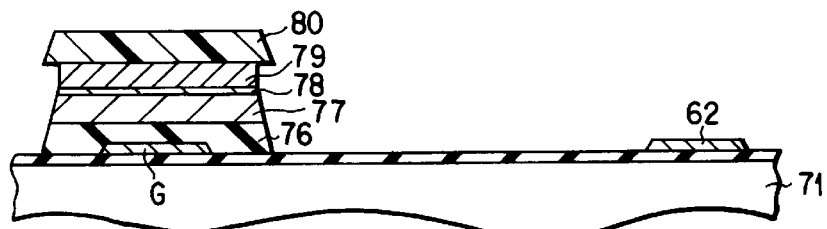

With the resist pattern 80 being left, the n⁺-type a-Si film 78, the a-Si film 77, and the SiNx film 76 as a gate insulating film are continuously etched and patterned into almost the same shape. This state of having the same shape or plan-view contour is substantially maintained even in the finished display. At this time, the n⁺-type a-Si film 78, the a-Si film 77, and the SiNx film 76 as the gate insulating film are also removed at the lead-out portion of the signal line around the pixel portion by etching to expose the signal line 62 (FIG. 15C).

Figure 15D:
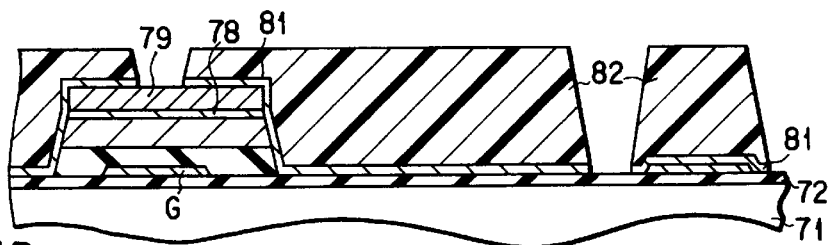

After removing the resist pattern 80, a transparent conductive film 81 of, e.g., ITO is deposited to 100 nm by sputtering. A resist is applied to the transparent conductive film 81 and patterned to form a resist pattern 82. The resultant structure is etched using the resist pattern 82 as a mask to form a pixel electrode 61 having a shape as shown in FIG. 14 (FIG. 15D). At this time, the Mo drain electrode D is electrically connected to the signal line 62 via the ITO film (transparent conductive film 81; third mask step).

In this manner, the pixel electrode 61 is formed of the transparent conductive film 81. Further, the drain D formed of the metal film 79 consisting of, e.g., Mo is electrically connected to the signal line 62 via the transparent conductive film 81 of ITO.

By leaving the transparent conductive film 81 on part of the address line 63, the resistance value of the address line 63 made of the upper metal film 79 consisting of, e.g., Mo is decreased by the transparent conductive film 81 of ITO, realizing a low resistance value.

Figure 15E:
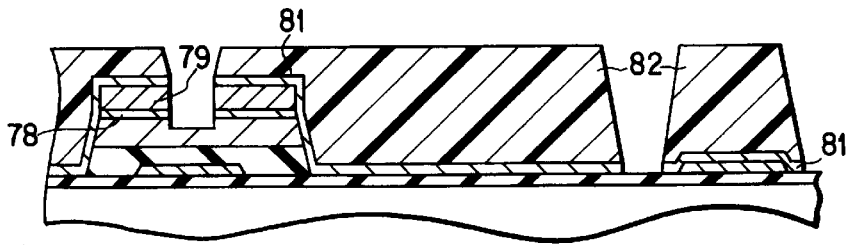
Figure 15F:
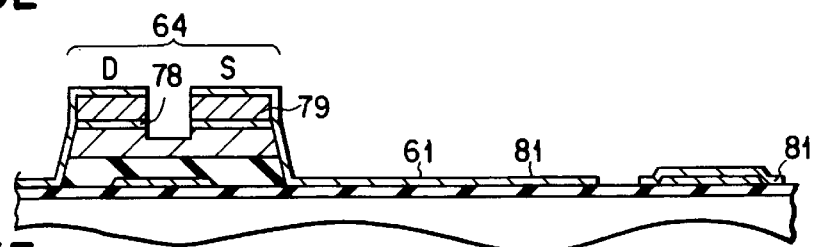

With the resist 82 being left on the pixel electrode 61 made of the transparent conductive film 81, the Mo metal film 79 and the n⁺-type a-Si film 78 between the source (S) and drain (D) of the thin film transistor (TFT) 64 are selectively removed using the resist 82 as a mask (FIG. 15E). Thereafter, the resist 82 is removed to complete a liquid crystal panel (FIG. 15F).

By the above three mask steps, the active matrix liquid crystal panel can be manufactured. The main steps will be explained below.

In the step of continuously patterning the metal film 79 consisting of, e.g., Mo, the n⁺-type a-Si film 78, the a-Si film 77, and the SiNx film 76 as the gate insulating film, the resist is first processed into a predetermined shape by photolithography. By using the resist as a mask, the uppermost Mo layer (metal layer 79) is etched by a solution mixture of phosphoric acid, acetic acid, and nitric acid. At this time, it is preferable to adjust the etching rate so as to perform side etching from the resist end by about 1 μm.

Next, with the resist pattern being left, the respective layers from the n⁺-type a-Si film 78 to the SiNx film 76 are etched by reactive ion etching (RIE) using a $CF_4$- or $SF_6$-based gas as a main component so as to taper the edge portions. At this time, it is preferable to set the etching pressure to 5 Pa or less so as not to cause side etching from the resist end.

When the edge surfaces of the respective layers from the n⁺-type a-Si film 78 to the SiNx film 76 are to be tapered in etching the respective films 78 to 76, $O_2$ or the like is added in the etching gas, and the etching is performed while ashing back the resist. Further, to completely prevent side etching, $CHF_3$ or $H_2$ is preferably used as an additive gas.

In the above embodiment, although the layers from the n⁺-type a-Si film 78 to the SiNx film 76 are etched with the resist being left, the resist hardened by RIE may be not removed in a resist removing step to leave residue which may cause a defect. To avoid this, it is possible to peel and remove the resist after the uppermost Mo film is etched, and etch the layers from the n⁺-type a-Si film to the SiNx film by using the Mo pattern as a mask, as shown in FIGS. 15A to 15F.

Alternatively, it is also possible to start the etching step with respect to the layers from the n⁺-type a-Si film 78 to the SiNx film 76 with the resist being left, add $O_2$ in the etching gas for, e.g., RIE, and remove the resist by ashing during etching.

The transparent conductive film 81 of, e.g., ITO is patterned into the shape of the pixel electrode, and the metal film 79 and the n⁺-type a-Si film 78 are selectively removed using the pixel electrode as part of a mask. In this step, the resist is first applied to the transparent conductive film 81 consisting of, e.g., ITO and patterned into a predetermined shape using photolithography. Next, the ITO film (transparent conductive film 81) is etched with an aqua regia-based etchant by using this resist pattern as a mask.

If the ITO film on the Mo film (metal film 79) is etched with aqua regia, it may be side-etched. Therefore, the ITO film may be etched with a hydrochloric acid-based etchant. Subsequently, the Mo film is removed by etching with a solution mixture of phosphoric acid, acetic acid, and nitric acid.

Next, with the resist being left, the n⁺-type a-Si film 78 is etched by RIE using a $CF_4$- or $SF_6$-based gas as a main component. At this time, the a-Si film 77 is etched by about 50 nm due to the manufacturing limitation to end the etching. According to the above method, in etching the Mo film constituting the metal film 79, the Mo film is side-etched more than the end of the ITO film. By adjusting the aqua regia-based etchant, the ITO and Mo films can be continuously etched into a tapered shape.

Alternatively, the Mo film (metal film 79) and the n⁺-type a-Si film 78 may be continuously etched by RIE. In the above embodiment, the resist used to etch the Mo film (metal film 79) is also used to etch the n⁺-type a-Si film 78. However, similar to the step of etching the respective films from the a-Si film 77 to the SiNx film 76, the resist used to etch the ITO film (transparent conductive film 81) can be removed after etching the ITO film. The subsequent etching process may be continued using the ITO film (transparent conductive film 81) left after patterning.

In the present invention, the resistance value of the address line is decreased, and the occurrence of a short circuit between the address and signal lines is reduced in a region where the address and signal lines cross each other. For this purpose, the signal line 62 is made narrower than the address line 63, and the ITO film (transparent conductive film 81) is used as the wide address line 63 by arranging the layer of the address line 63 above the layer of the signal line 62. With this arrangement, the resistance value of the address line is decreased, while decreasing the probability of the occurrence of a short circuit between the address and signal liens due to undesirable ITO residues. This will be explained below.

In a structure shown in FIGS. 16A to 16D, the address line 63 is formed on the undercoat layer 72 side (the undercoat layer 72 is directly formed on the substrate 71), and the signal line 62 is formed on the upper surface side via the insulating film 76 formed thereon. An address line width $\underline{a}$ and a signal line width $\underline{b}$ have the relation of a>b. To insulate the address and signal lines from each other at the intersection of the address and signal lines 63 and 62, the insulating film 76 below the signal line 62 is made wider than the signal line 62. However, the increase in width is limited in relation to other factors. The crossing length of the signal line 62 across the address line 63 therefore affects the probability of the occurrence of a short circuit.

In the structure shown in FIGS. 16A to 16D, the address line 63 is formed on the undercoat layer 72 side, and the signal line is formed on the upper surface side via the insulating film. The ITO film formed on the upper layer side constitutes the signal line. Further, the length of a portion exposed from the SiNx film 76 by ITO pattern failure corresponds to the address line width $\underline{a}$ at the intersection of the ITO pattern (transparent conductive film 81) and the address line 63.

Figure 16A:
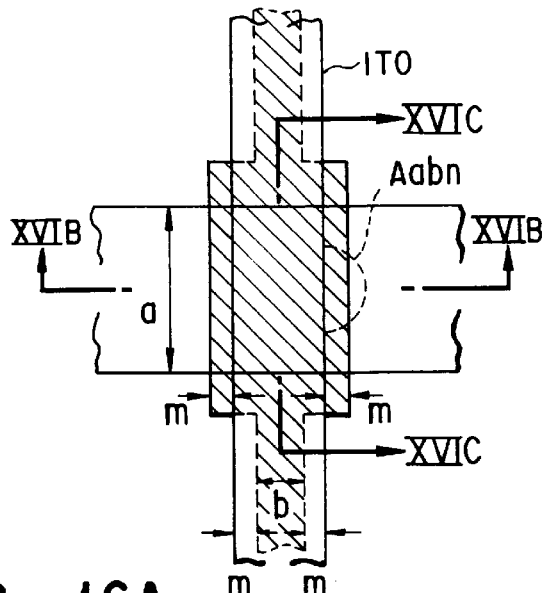
FIGS. 16A to 16D and 17A to 17D are views for explaining the relationship between the positional relationship between the signal and address lines in a vertical direction, and the mechanism of defect formation.
Figure 16B:
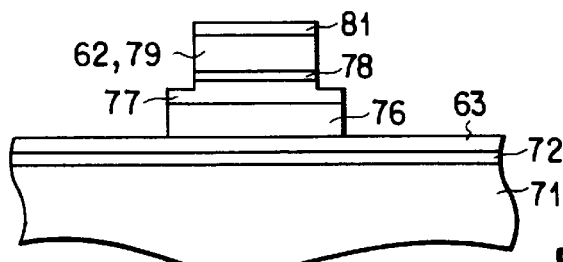
Figure 16C:
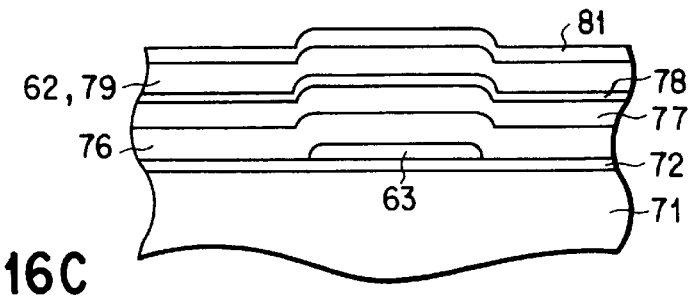
Figure 16D:
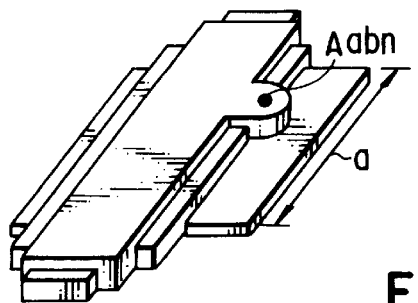

A probability P1 of occurrence of a short circuit between the address and signal lines in this structure is expressed as follows:

$P1=P1x+P1y$ where P1x is the probability of occurrence of a short circuit caused by a defect of the insulating film at the intersection, and P1y is the probability of occurrence of a short circuit caused by an irregular ITO pattern such as a portion Aabn indicated by a dotted line in FIG. 16A. Therefore, $P1x=\alpha \cdot a \cdot (b+4m)$ $P1y=\beta \cdot a$ where $\alpha$ and $\beta$ are constants determined by the levels of steps, and $\underline{m}$ m is the width from the edge of the ITO film to the edge of the underlying insulating layer pattern in the crossing region. This width is a margin in a process in consideration of alignment deviation of a mask.

Figure 17A:
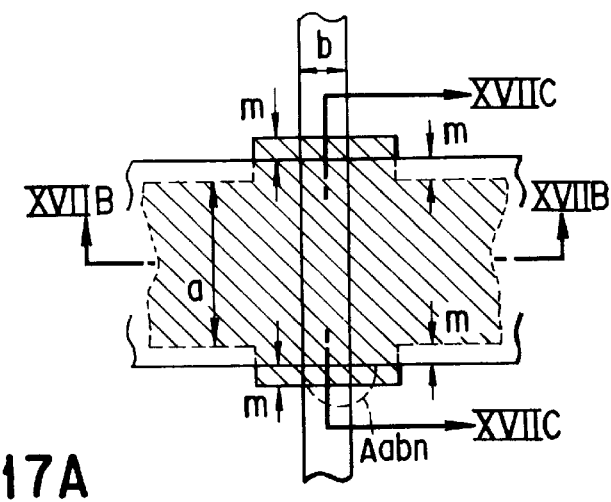
Figure 17B:
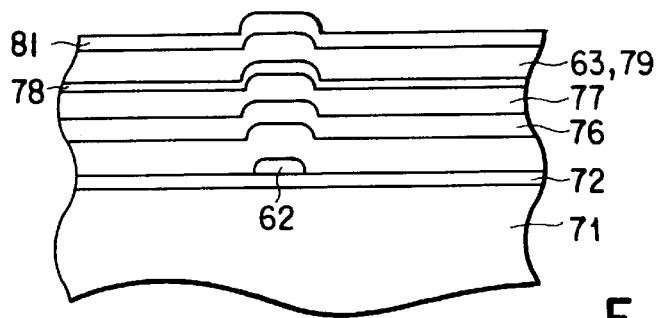
Figure 17C:
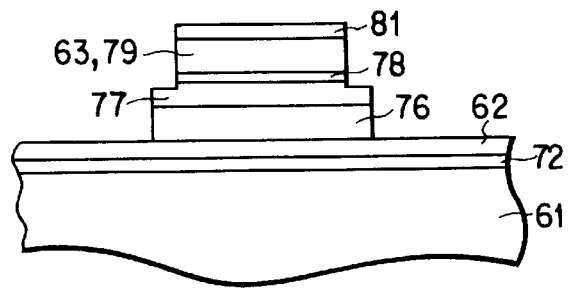
Figure 17D:
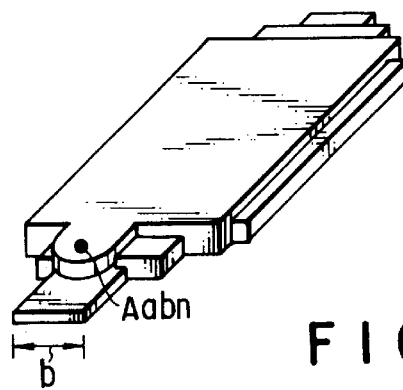

FIG. 17A is a plan view showing the intersection of the address and signal lines in a structure formed by the method shown in FIGS. 15A to 15F. For the sake of descriptive convenience, the resistance value of a lower metal film is assumed to be equal to that of an upper metal film. For the sake of comparative convenience, the address line width $\underline{a}$ and the signal line width $\underline{b}$ are equal to those of the structure shown in FIG. 16A. According to the present invention, in stacking the respective layers on the substrate 71 as a lower layer, the signal line 62 is formed on the undercoat layer 72 side (the signal line 62 is formed on the lower layer side), the address line 63 is formed on the upper layer side above the insulating layer (SiNx film 76) formed above the signal line 62, and the ITO film (transparent conductive film 81) is formed thereon.

The ITO film (transparent conductive film 81) is therefore integrated with the address line 63 made of the metal film 79 consisting of, e.g., Mo to constitute part of the address line 63. Further, the length of the portion exposed from the insulating film (SiNx film 76) by ITO pattern failure at the intersection of the ITO pattern (transparent conductive film 81) and the signal line 62 corresponds to the signal line width $\underline{b}$ at most.

A probability P2 of occurrence of a short circuit between the address and signal lines in this structure is expressed as follows:

$P2=P2x+P2y$ $P2x=\alpha \cdot b \cdot (a+4m)$ $P2y=\beta \cdot b$

The short circuit probability P1 in the structure of FIGS. 16A to 16D is compared with the short circuit probability P2 in the structure of FIGS. 17A to 17D:

$P1-P2=\alpha \cdot 4m \cdot (a-b)+\beta \cdot (a-b)$ $=(a-b) \cdot (4m\alpha+\beta)$ Generally in an OA liquid crystal display, e.g., in the VGA, the XGA, and the SXGA, a severer resistance value is required for the address line 63 than the signal line 62. In the present invention, therefore, the address line width $\underline{a}$ and the signal line width $\underline{b}$ are set to have the relation of a>b.

The narrow signal line 62 is arranged on the undercoat layer 72, the insulating film 76 is formed on the surface side, and the wide address line 63 is formed on this insulating film (SiNx film 76). In this manner, the narrow signal line 62 is arranged below the wide address line 63 on the surface side via the insulating layer (SiNx film 76). As a result, the crossing distance of the address line 63 made of the ITO film (transparent conductive film 81) across the narrow signal line 62 corresponds to the address line width, and the relationship between P1 and P2 is such that P1−P2>0 holds. Therefore, the yield of the structure in FIGS. 17A to 17D is always higher. In other words, if a>b, the effect of decreasing the occurrence of a short circuit between the address and signal lines is attained.

The terms P1y and P2y are unique to a structure wherein a semiconductor layer and a gate insulating layer are removed with a pattern almost the same as that of an Mo film.

As described above, a large screen and a high definition can be realized in the active matrix liquid crystal panel by using an ITO film formed on the upper layer side for the address line and decreasing the resistance value of the address line. In addition, the insulating layer is formed below the wide address line, and the narrow signal line is arranged therebelow. With this structure, the probability of occurrence of a short circuit between the address and signal lines due to remaining ITO residues can be greatly decreased in etching the ITO film.

The embodiment shown in FIGS. 15A to 15F is directed to the technique of decreasing the resistance of the address line and suppressing the occurrence of a short circuit at the intersection of the address and signal lines due to ITO residues by using the ITO film for the pixel electrode.

Next, still another embodiment will be described wherein the embodiment shown in FIGS. 15A to 15F is improved and Al (aluminum) is used for the wiring layer or interconnect in order to decrease the resistance value of the address line.

In this embodiment, the basic steps of the embodiment shown in FIGS. 15A to 15F are employed without any change, and only the step of etching a metal film and an ITO film is changed. With this change, a metal film 79 made of a multilayered film containing low-resistance Al (aluminum) can be used, in place of the metal film 79 consisting of high-resistance Mo in the above embodiment, thereby decreasing the resistance of the wiring layer. In this embodiment, the upper Mo is used as a contact layer with ITO and also as a halation-preventing layer in a photolithography step, while the lower Mo is used as a contact layer with an $n^+$-type a-Si film. Its main steps will be explained below.

In this embodiment, Mo is not completely abandoned, and a multilayered structure of Mo and Al is used as the metal film 79 to decrease the electrical resistance at the metal film 79. That is, after forming an $n^+$-type a-Si film 78, Mo, Al, and Mo are sequentially deposited thereon by sputtering in this order to form the metal film 79 consisting of Mo and Al. The film thicknesses are 50 nm, 300 nm, and 50 nm in this order from the upper film.

In this manner, the metal film 79 having a three-layered Mo/Al/Mo structure is formed on the $n^+$-type a-Si film 78. The metal film 79, the $n^+$-type a-Si film 78, an a-Si film 77, and an SiNx film 76 as a gate insulating film are continuously etched and patterned into almost the same shape. In this step, the metal film 79 having the three-layered Mo/Al/Mo structure, as the uppermost layer, is first etched with a solution mixture of phosphoric acid, acetic acid, and nitric acid.

Next, with the resist pattern 20 being left, the structure from the $n^+$-type a-Si film 18 to the SiNx film 16 is etched by reactive ion etching (RIE) using a $CF_4$- or $SF_6$-based gas as a main component. At this time, it is preferable to set the etching pressure to 5 Pa or less so as not to cause side etching from the resist end. Further, to completely prevent side etching, $CHF_3$ and $H_2$ may be preferably added to the etching gas so that side wall deposition is utilized. When the end face of the structure from the $n^+$-type a-Si film 18 to the SiNx film 16 is to be tapered, $O_2$ or the like is added in the etching gas, and the structure is etched while ashing back the resist.

Then, a transparent conductive film 81 consisting of, e.g., ITO is formed on the surface. The transparent conductive film 81 is patterned into the shape of a pixel electrode, and the metal film 79 and the $n^+$-type a-Si film are selectively removed using the transparent conductive film 81 as part of a mask. In this step, the ITO film is first etched by RIE using methane or alcohol gas, HI gas, or the like as a main component. It is found in wet etching with an aqua regia-based solution or the like that ITO residues and the like are produced depending on the potential in the wet etchant for Al and ITO to pose a problem in etching. For this reason, the ITO film is etched by RIE.

Next, the three-layered Mo/Al/Mo structure as the metal film 79 is removed by etching with a solution mixture of phosphoric acid, acetic acid, and nitric acid. Using the same resist, the $n^+$-type a-Si film 78 is etched by RIE using a $CF_4$-based gas as a main component. At this time, the a-Si film 77 is etched by about 50 nm due to the manufacturing limitation to end the etching.

According to the above method, in etching the Mo/Al/Mo structure, the Mo/Al/Mo structure is side-etched more than the end of the ITO film. The Mo/Al/Mo structure can be anisotropically etched by RIE using $CF_4$, $Cl_{21}$ or the like as a main component. In this case, the $n^+$-type a-Si film can be continuously etched.

Since the ITO film constituting the transparent conductive film 81 is dry-etched by RIE, a low-resistance material such as Al can be used for the metal film 79. When Al is used for the gate electrode, it is desirable to similarly dry-etch the ITO film by RIE.

According to this embodiment, therefore, the active matrix liquid crystal panel wherein signal delays are eliminated by decreasing the electrical resistance of the wiring layer using the metal film 79 can be obtained by forming the metal film 79 into a three-layered Mo/Al/Mo structure.

In the active matrix liquid crystal panel, a TFT as the driving element of each pixel is turned on to receive a pixel driving signal or a display signal, and then the TFT is turned off. In this manner, the pixel driving signal is held for a predetermined time, and the liquid crystal cell performs a pixel display at a density corresponding to the signal. To help hold the signal, an auxiliary capacitance Cs is set for each pixel in some cases.

In the structure according to the present invention, a capacitor can be formed between the upper and lower electrodes and can be used as an auxiliary capacitance Cs. Some variations of the structure can be considered by connecting a pixel electrode 61 to the upper electrode of the auxiliary capacitance, i.e., an auxiliary capacitance wiring layer 67 (79) or a lower electrode 66. If the resistance value of the auxiliary capacitance wiring layer 67 is high, it is also observed as nonuniformity on the screen and the like. In general, a low-resistance metal can be easily used for an upper layer (surface side) in terms of the manufacturing process. For this reason, the auxiliary capacitance wiring layer 67 is preferably formed of the material of the upper layer.

FIGS. 18A and 18B, FIGS. 19A and 19B, and FIGS. 20A and 20B show some variations of the pixel, respectively. FIGS. 18A and 18B, and FIGS. 19A and 19B show cases wherein the pixel electrode 61 is connected to the lower electrode 66 formed of the same material as that of a gate electrode G, and FIGS. 20A and 20B show a case wherein the pixel electrode 61 is connected to the upper electrode 67 formed of the metal film 79.

All of these structures are constituted using the process described in the embodiment shown in FIGS. 15A to 15F. In the three examples, therefore, no protection film consisting of, e.g., SiNx is formed on the active matrix liquid crystal panel. The active matrix liquid crystal panel can be formed by three mask steps.

The protection film consisting of, e.g., SiNx may be formed to stabilize the operation over an extended period of time and prevent a leakage current from flowing across upper and lower wiring layers on the end face of an insulating film, as a matter of course. In this case, the peripheral electrode contact portion and the protection film on a pixel electrode may be eliminated.

In general, it is known that if the overlapping state of the source S/drain D and the gate G of a TFT changes, a parasitic capacitance Cgs between the gate and the pixel electrode changes. The change in parasitic capacitance Cgs between the gate and the pixel electrode causes nonuniformity on the screen.

The parasitic capacitance changes always pose a problem. In some cases, a pattern within the screen is divided into some regions to perform exposure in a photolithography step due to the manufacturing limitation of the active matrix panel. In this case, the overlapping state of the source/drain electrode and the gate electrode abruptly changes at the joint on the screen. This change is observed as nonuniformity on the screen.

This is because a change in punch-through voltage (ΔVp) is recognized as nonuniformity on the screen. The punch-through voltage ΔVp is generally expressed by the following equation:

$$\Delta Vp = (Cgs \cdot \Delta Vg)/(Cs + Clc + Cgs)$$

where Cs is the auxiliary capacitance, Clc is the liquid crystal capacitance between the pixel electrode and the counter electrode, and ΔVg is the change amount of the gate pulse.

A structure shown in FIG. 21 is an embodiment which prevents the punch-through voltage ΔVp, and uses two TFTs in parallel. The relationship between the arrangement of layers 63 and 81 is designed as in the embodiment shown in FIG. 14. As shown in FIG. 21, two TFTs, i.e., first and second TFTs 64a and 64b are arranged to cancel the parasitic capacitance Cgs between the gate and the pixel electrode. In this embodiment, to decrease the wiring resistance of the signal line, the upper metal layer and the pixel electrode material are left on a lower signal line 62 in a region outside the crossing region with the address line. With this arrangement, the wiring resistance of the signal line can be decreased, and the operation speed is further increased to contribute to an increase in screen size. At the same time, the parasitic capacitance Cgs is canceled to suppress the occurrence of nonuniformity on the screen.

In this case, if the pixel is highly micro-patterned to arrange the two TFTs 64a and 64b, the TFT arrangement region accounts for a relatively large ratio. As a result, the aperture ratio of the pixel electrode is decreased, or the parasitic capacitance of the TFT connected to an address line 63 becomes large, posing problems such as a gate pulse delay. The TFT arrangement in FIG. 21 is optimized to minimize these problems in arranging the two TFTs. However, in a high-definition liquid crystal panel, it is desirable if nonuniformity caused by a punch-through voltage can be easily canceled even in an arrangement using one TFT per pixel.

Figure 22:
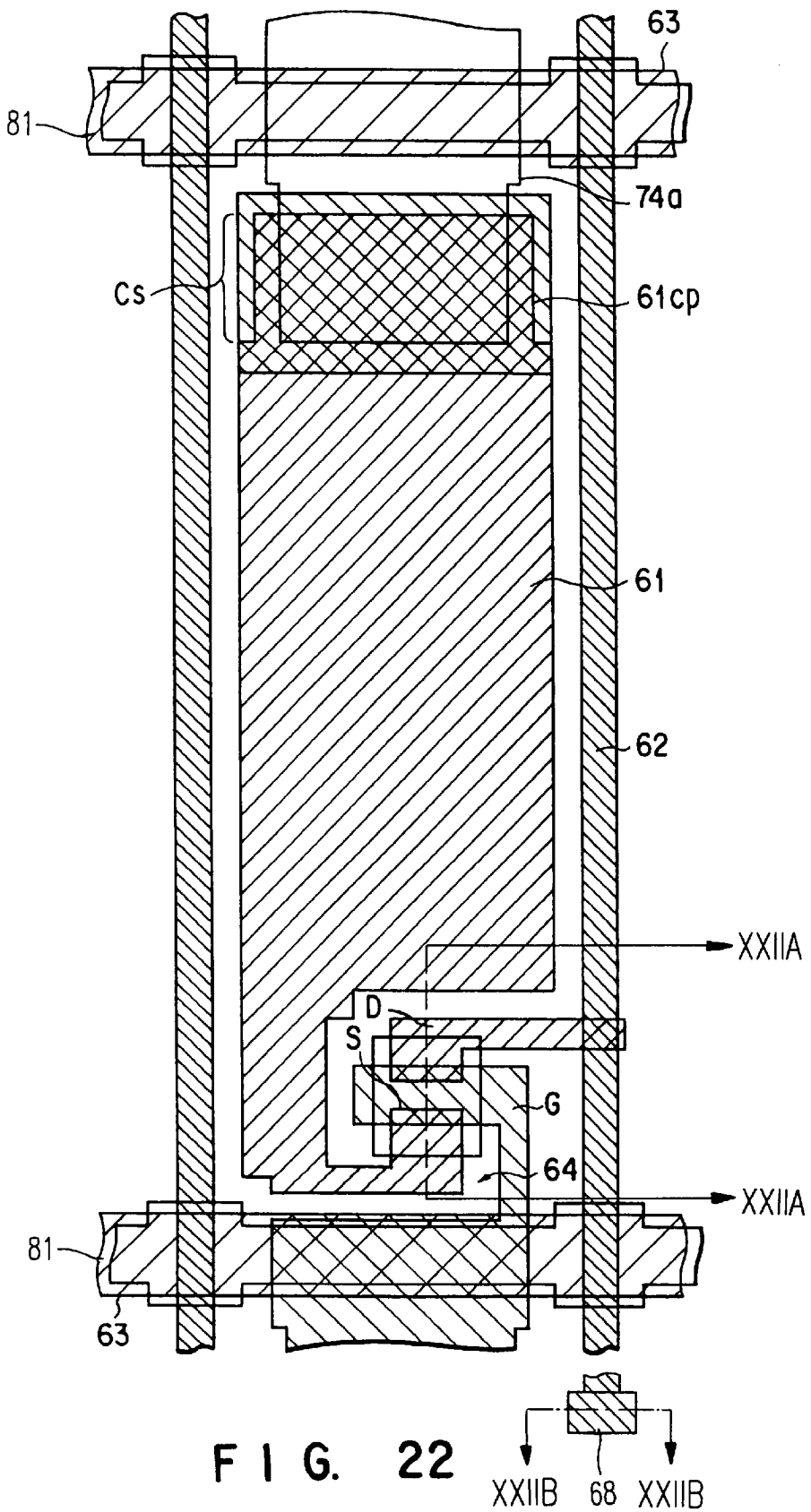

FIG. 22 shows an embodiment wherein nonuniformity caused by the punch-through voltage ΔVp can be easily canceled even in an arrangement using one TFT per pixel. The relationship between the arrangement of layers 63 and 81 is designed as in the embodiment shown in FIG. 14. As a basic characteristic feature of the structure, for example, when an alignment shift occurs in a direction to decrease the parasitic capacitance between the gate and the pixel electrode, the capacity of the auxiliary capacitance Cs also decreases.

More specifically, one TFT 64 is so arranged as to align a source S, a gate G, and a drain D on one end side of a rectangular pixel electrode 61 in the longitudinal direction of the pixel electrode 61. The auxiliary capacitance Cs is formed on the other end side of the pixel electrode 61 by using part of the pixel electrode 61 as another electrode. The electrode forming the auxiliary capacitance Cs serves as an auxiliary capacitance formation portion 61cp of the pixel electrode 61. A conductive film (lower electrode 74a of the auxiliary capacitance) patterned into a square shape is arranged at the auxiliary capacitance formation portion 61cp via an insulating film. A capacitor is formed at the overlapping portion of this portion 61cp with this conductive film to form the auxiliary capacitance Cs.

In this embodiment, the lower electrode 74a of the auxiliary capacitance Cs is integrated with the gate electrode G of the TFT 64 of the adjacent pixel. That is, one end of the pattern forms the lower electrode 74a of the auxiliary capacitance, and the other end serves as the gate electrode G of the TFT 64 of the adjacent pixel.

The patterned conductive film (the lower electrode 74a of the auxiliary capacitance) for integrally forming the auxiliary capacitance Cs and the gate electrode G of the TFT 64 is simultaneously formed for a plurality of pixels by forming a metal film on an undercoat layer 72 on an insulating substrate 71 and etching these films using a resist mask formed into a predetermined pattern. For this reason, the relative positional relationship between the lower electrode 74a of the auxiliary capacitance of each adjacent pixel and the gate electrode G of the TFT 64 is the same in the plurality of pixels simultaneously formed. In each pixel electrode 61 having the electrode of the auxiliary capacitance portion at the end portion side, even if the position of the source/drain electrode is shifted from the position of the gate electrode in forming the pattern of the pixel electrode 61, the region serving as the electrode of the auxiliary capacitance portion is also shifted in the same direction. Further, the position of the pixel electrode 61 is shifted from the lower electrode 74a of the auxiliary capacitance Cs by the same amount.

More specifically, even if the formation position of the pixel electrode 61 is shifted with respect to the gate electrode G, the lower electrode 74a of the auxiliary capacitance and the gate electrode G of the TFT 64 also shift by the same amount. From this result, when an alignment shift occurs in a direction to decrease the parasitic capacitance Cgs between the gate and pixel electrode, each pixel similarly shift to decrease the capacity of the auxiliary capacitance Cs.

As is apparent from the above equation, even if an alignment shift occurs, the arrangement can therefore be improved to reduce changes in punch-through voltage ΔVp, though not completely prevented.

When the liquid crystal panel of this embodiment was actually formed, changes in punch-through voltage ΔVp could be reduced by about 30%. Note that this structure can be applied not only to the embodiment shown in FIGS. 15A to 15F and its modification but also to the embodiment shown in FIGS. 2A to 2F and the method explained with reference to FIGS. 31A to 31F.

As described above, the embodiments described with reference to FIGS. 15A to 22 are characterized in that the address line is arranged above the signal line at the intersection of the address and signal lines in an active matrix panel having a structure wherein a plurality of address lines (gate lines) and signal lines are arranged in a matrix array on an insulating substrate via a thin semiconductor film.

With this arrangement, the address line is located on the upper layer side, and a transparent conductive film consisting of, e.g., ITO, which is provided to be used for a pixel electrode and the like, can be used as part of the address line on the upper layer side. Therefore, the resistance of the address line can be decreased, which is required in terms of suppressing signal delays, thereby realizing a high-definition, large-screen liquid crystal panel. In addition, to decrease the line width of the signal line, the signal line crossing width of the transparent conductive film (ITO) on the address line can be decreased at the intersection of the signal and address lines. Therefore, the yield can be increased by decreasing the probability of occurrence of a short circuit between the address and signal lines due to a projecting portion in patterning the transparent conductive film to form part of the address line.

Since the liquid crystal panel can be manufactured by three mask steps, it can be manufactured by simple steps. In addition to the above increase in yield, the cost can be greatly decreased.

Further, when an auxiliary capacitance is to be formed, the gate electrode of a driving element consisting of a thin semiconductor film to drive a pixel, and one electrode of the auxiliary capacitance Cs can be simultaneously formed, and part of the pixel electrode can be formed as the other electrode of the auxiliary capacitance Cs. Therefore, the auxiliary capacitance can be formed, resulting in a decrease in cost, while adopting the three mask manufacturing method to the manufacturing process.

According to the present invention, the driving element consisting of the thin semiconductor film to drive the pixel is constituted by two TFTs, i.e., the first and second TFTs, which can be arranged to cancel the parasitic capacitance Cgs between the gate and the pixel electrode. To decrease the wiring resistance of the signal line, the upper metal layer and the material of the pixel electrode can be left on the lower signal line in a region outside the crossing region with the address line. With this arrangement, the wiring resistance of the signal line can be decreased to increase the operation speed, which contributes an increase in screen size. Moreover, the parasitic capacitance Cgs can be canceled to suppress the occurrence of nonuniformity on the screen. A high-quality liquid crystal display panel can be obtained.

According to any of the above embodiments, Al as a low-resistance metal can be used for a wiring layer, and an active matrix panel can be manufactured by a small number of mask steps at a high yield. That is, after a gate insulating film, an a-Si film, an $n^+$-type a-Si film, and a metal film, which are to be formed on the gate electrode of a TFT, are continuously deposited, the gate insulating film, the a-Si film, the $n^+$-type a-Si film, and the metal film are patterned into almost the same shape. Then, a transparent conductive film is deposited and patterned into the shapes of a source electrode and a drain electrode serving as a pixel electrode. The metal film and the $n^+$-type a-Si film are selectively removed using the transparent conductive film as part of a mask. In this manner, the active matrix array is obtained by the three mask steps.

After being continuously deposited, the gate insulating film, the a-Si film, the $n^+$-type a-Si film, and the metal film are patterned into almost the same shape. After this patterning, a transparent conductive ITO film is formed on the surface of a step constituted by the gate insulating film, the a-Si film, the $n^+$-type a-Si film, and the metal film. To make the transparent conductive film smooth, the step shape must be made precise in patterning, which is difficult to control.

For example, the step constituted by the metal film, the $n^+$-type a-Si film, the a-Si film, and the gate insulating film is generally about 700 nm. The 700-nm step must be covered with a pixel electrode (transparent conductive ITO film) having a thickness of about 100 nm. It is difficult to control the shape of the step constituted by the metal film, the $n^+$-type a-Si film, the a-Si film, and the gate insulating film.

Next, an embodiment to solve this problem will be described.

The difficult control of the step shape results from the height of the step. In this embodiment, to make the step low, the gate insulating film is not patterned, and only the a-Si film, the $n^+$-type a-Si film, and the metal film on the gate insulating film are patterned. This structure can still be manufactured by only three mask steps.

Figure 23A:
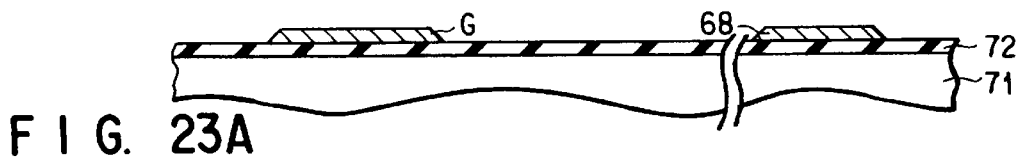
FIGS. 23A to 23C are sectional views respectively showing the steps in a method of manufacturing a liquid crystal panel according to still another embodiment of the present invention with the left and right sections corresponding to views taken along lines XXIIA and XXIIB, respectively, of FIG. 22.
Figure 23B:
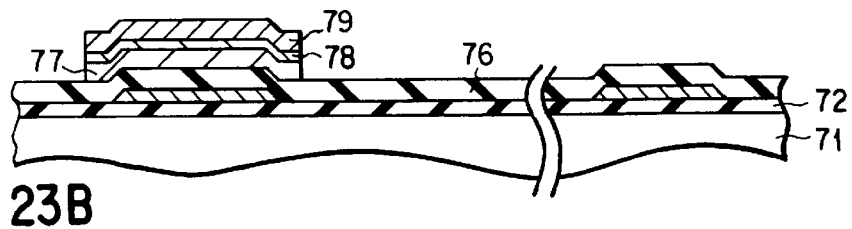
Figure 23C:
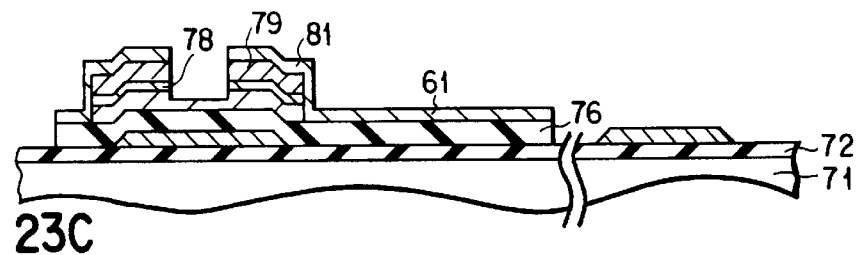

FIGS. 23A to 23C are sectional views respectively showing the steps of manufacturing an active matrix panel according to still another embodiment of the present invention based on the above viewpoint.

First, a transparent insulating substrate 71 such as a glass substrate is coated with SiOx by sputtering, a CVD method, or the like to form an undercoat layer 72. After a layer consisting of a refractory metal such as an Mo—Ta alloy is formed on the entire surface, this layer is patterned to form an address line 63, a gate electrode G, a peripheral pad portion 68, and the like (FIG. 23A; first mask step).

SiNx, a-Si, and $n^+$-type a-Si are respectively deposited to 300 nm, 250 nm, and 30 nm on the gate electrode G by plasma CVD without breaking the vacuum. In this manner, an SiNx film (gate insulating film) 76, an a-Si film 77, and an $n^+$-type a-Si film 78 are formed on the gate electrode G and the address line 63. To prevent an interlayer short circuit from being formed by a pinhole and the like, the vacuum may be broken once, and the SiNx film may be deposited in two steps. The film qualities of the upper and lower SiNx layers may be changed.

Upon completion of the formation of the address line 63 and the gate electrode G and the formation of the SiNx film (gate insulating film) 76, the a-Si film 77, and the $n^+$-type a-Si film 78, a metal film 79 consisting of, e.g., Mo is deposited thereon by sputtering. The deposited metal film 79 consisting of Mo is etched and patterned using an etchant of phosphoric acid, nitric acid, and acetic acid. At this time, the Mo pattern includes the patterns of a source electrode S, a drain electrode X, and a signal line 62 (second mask step).

With the resist being left, the resultant structure is patterned into almost the same shape as that of the Mo electrode (the source electrode S and the drain electrode D) by continuously etching the $n^+$-type a-Si film 78 and the a-Si film 77 selectively with respect to the SiNx film 76 using $SF_6/Cl_2/O_2$-based dry etching (FIG. 23B).

Next, a transparent conductive film 81 of, e.g., ITO is deposited to 100 nm by sputtering. The deposited transparent conductive film 81 is patterned into the shape of the pixel electrode by using a resist (third mask step).

With the resist being left on the pixel electrode, the metal film 79 consisting of Mo, the $n^+$-type a-Si film 78 between the source and drain of a thin film transistor (TFT), and the gate insulating film 76 consisting of SiNx are selectively removed into almost the same shape as that of the pixel electrode (FIG. 23C).

By the above three mask steps, the active matrix panel can be formed. In this embodiment, since the pixel electrode made of the transparent conductive film 81 is formed on the gate insulating film 76 consisting of SiNx, only the a-Si film 77, the $n^+$-type a-Si film 78, and the metal film 79 on the gate insulating film 76 are patterned without patterning the SiNx film 76 on the gate electrode G. Therefore, the step is made lower by the thickness of the gate insulating film 76 than the conventional one. Since the thickness of the gate insulating film 76 is 300 nm, the height of the step is almost ½ the conventional one.

It is easy to cover this step with the pixel electrode (transparent conductive ITO film 81), and it is also easy to control the shape of the step constituted by the metal film, the $n^+$-type a-Si film, and the a-Si film. The yield is increased, and the manufacturing process is simplified, resulting in high productivity and low cost. In addition, since the gate electrode on the lower layer is covered with the gate insulating film during the process, etching and cleaning processes can be easily performed.

Main steps will now be described in detail.

FIGS. 24A to 24D show the steps of patterning the transparent conductive film 81 into the shape of the pixel electrode and selectively removing the metal film 79, the $n^+$-type a-Si film 78, and the gate insulating film 76 consisting of SiNx on the gate electrode G by using the pixel electrode as part of a mask.

Figure 24A:
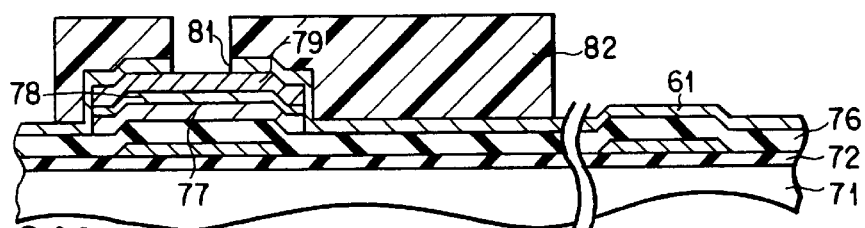
FIGS. 24A to 24D are sectional views respectively showing the steps for a main portion in the manufacturing method shown in FIGS. 23A to 23C in detail with the left and right sections corresponding to views taken along lines XXIIA and XXIIB, respectively, of FIG. 22.

First, a resist pattern 82 is formed on the ITO film for forming the transparent conductive film 81, and is formed into a predetermined shape using photolithography to obtain a resist mask (FIG. 24A).

Figure 24B:
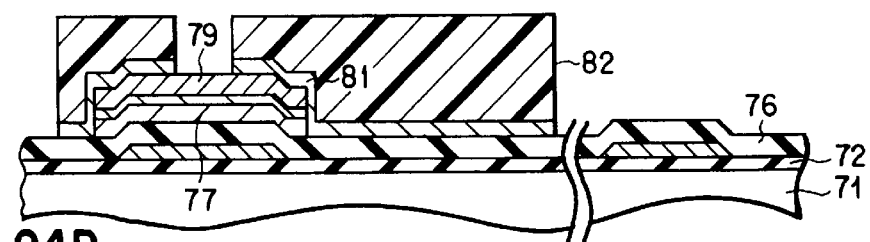
Figure 24C:
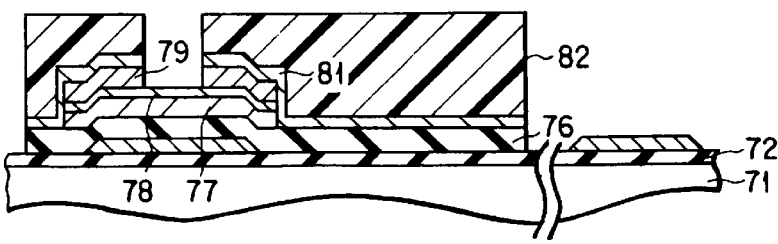

Next, ITO (transparent conductive film 81) is etched with a hydrochloric acid-based solution using the resist pattern 82 as the mask (FIG. 24B). The Mo film (metal film 79) is removed by $SF_6/Cl_2/O_2$-based plasma etching (FIG. 24C).

Figure 24D:
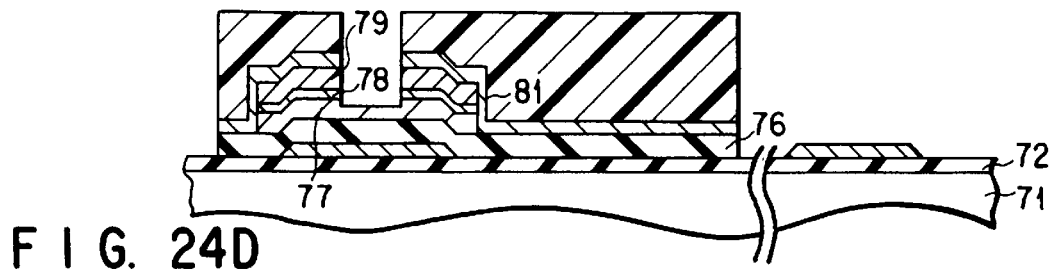
Figure 25A:
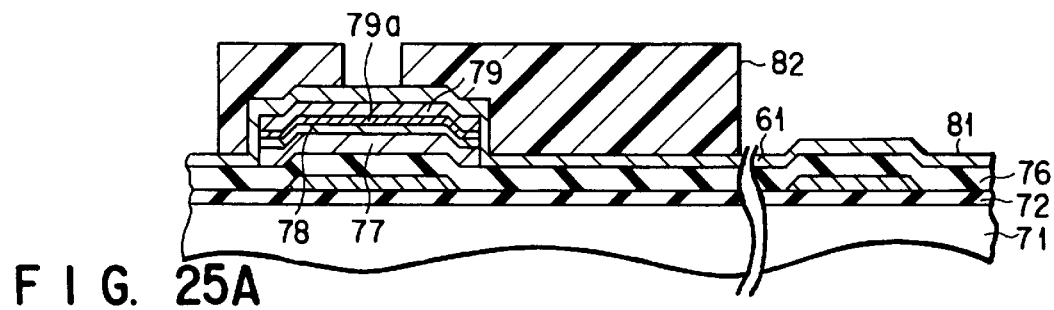
FIGS. 25A to 25D are sectional views respectively showing the steps in a modification of the main portion in the manufacturing method shown in FIGS. 23A to 23C with the left and right sections corresponding to views taken along lines XXIIA and XXIIB, respectively, of FIG. 22.
Figure 25B:
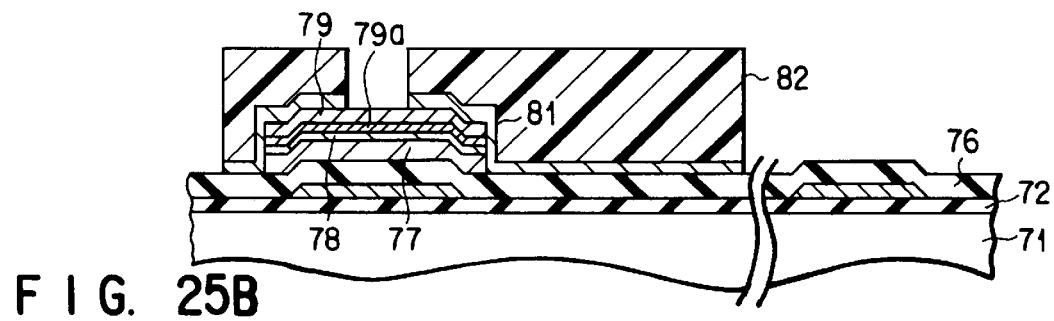
Figure 25C:
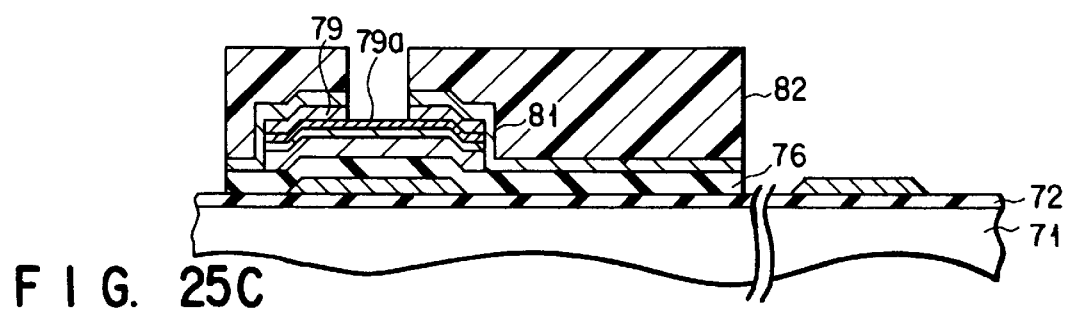
Figure 25D:
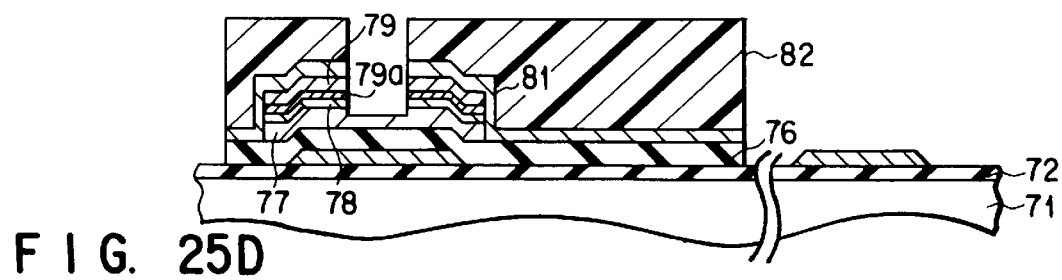

At this time, SiNx as the gate insulating film 76 may be also removed by etching. However, the gas mixing ratio is adjusted such that a-Si (a-Si film 77) and Mo—Ta (metal film 63, 68) can be selectively etched. Subsequently, the mixing ratio is changed, and $n^+$-type a-Si ($n^+$-type a-Si film 78) is etched (FIG. 24D).

If anisotropy etching such as reactive ion etching is used to etch the Mo layer below the ITO film (transparent conductive film 81), the Mo layer can be prevented from being side-etched. As a result, when a protection film consisting of, e.g., SiNx is finally formed, the coverage can be increased.

According to the above embodiment, the step is made low to facilitate the manufacture of the active matrix panel. However, since the metal such as Mo—Ta is used for a wiring layer, the resistance cannot be decreased. Next, an embodiment wherein an Al-based metal is used for an address line and a gate electrode will be described.

The embodiment using the Al-based metal for the address line and the gate electrode is not illustrated because its steps are the same as those in the embodiment shown in FIGS. 23A to 23C and 24A to 24D.

First, a transparent insulating substrate 71 such as a glass substrate is coated with SiOx by sputtering, a CVD method, or the like to form an undercoat layer 72. A metal such as an Al—Ta alloy resistant to a hillock is deposited and patterned to form an address line 63 and a gate electrode G (first mask step). SiNx, a-Si, and $n^+$-type a-Si are respectively deposited to 300 nm, 250 nm, and 30 nm on the gate electrode G by plasma CVD without breaking the vacuum. In this manner, an SiNx film 76, an a-Si film 77, and an $n^+$-type a-Si film 78 are sequentially formed.

To prevent an interlayer short circuit from being formed by a pinhole and the like, the vacuum may be broken once, and SiNx may be deposited in two steps.

A metal film 79 consisting of, e.g., Mo is deposited by sputtering. A resist mask is formed on the metal film 79. Using this resist mask, the metal film 79 is etched and patterned with an etchant of phosphoric acid, nitric acid, and acetic acid (second mask step). At this time, the pattern of the Mo film (metal film 79) includes the patterns of a source electrode S, a drain electrode D, and a signal line 62. With the resist mask being left, the resultant structure is patterned into almost the same shape as that of the Mo electrode (source electrode S and drain electrode D) formed of the metal film 79 by continuously etching the $n^+$-type a-Si film 78 and the a-Si film 77 and selectively etching those relative to SiNx as the gate insulating film 76 using $SF_6/Cl_2/O_2$ based dry etching.

Next, a transparent conductive film 81 of, e.g., ITO is deposited to 100 nm by sputtering. A resist mask is formed on the transparent conductive film 81. By using this resist mask, the transparent conductive film 81 is patterned into the shape of the pixel electrode (third mask step).

At this time, since the address line 63 consisting of an Al-based alloy is covered with the gate insulating film, a strong acid can be used as an etchant for ITO. With this gate insulating film, ITO can also be prevented from changing in quality due to an oxidation-reduction reaction caused by Al and ITO in contact with each other in a resist developing solution or an etchant.

With the resist being left on the pixel electrode, the Mo film (metal film 79), the $n^+$-type a-Si film 78 between the source and drain of a thin film transistor (TFT), and the gate insulating film 76 consisting of SiNx are selectively removed into almost the same shape as that of the pixel electrode.

As described above, according to this embodiment, even if the Al-based metal is used for the address line and the gate electrode, the active matrix panel can be formed by the three mask steps.

In the step of patterning the transparent conductive film 81 into the shape of the pixel electrode and selectively removing the metal film, the $n^+$-type a-Si film, and the gate insulating film consisting of SiNx on the peripheral address line electrode pad by using the pixel electrode as part of a mask, a resist is similarly formed into a predetermined shape on the ITO film by using photolithography. Using this resist as a mask, the ITO film is etched with a hydrochloric acid-based etchant.

Then, the Mo film is removed by $SF_6/Cl_2/O_2$-based plasma etching. At this time, the SiNx film as the gate insulating film is also removed by etching. By adjusting the mixing ratio, those can be selectively etched relative to the a-Si film and the Al-based alloy. Subsequently, the mixing ratio is changed, and the $n^+$-type a-Si film is etched.

In the above embodiment, if Mo as the signal line electrode and a-Si cannot be sufficiently selectively etched, the etching depth of a-Si may vary due to the etching distribution of Mo, resulting in variations in TFT characteristics.

Next, still another embodiment of the present invention to solve this problem will be described. In this embodiment, a patterning regulation metal film 79a consisting of a thin W (tungsten) alloy is arranged below an Mo film (metal film 79), and patterned. The patterned thin W alloy layer (patterning regulation metal film 79a) forms an etching stopper. This embodiment will be explained below. Note that some of the steps of this embodiment will be described later with reference to FIGS. 25A to 25D.

First, a transparent insulating substrate 71 such as a glass substrate is coated with SiOx by sputtering, a CVD method, or the like to form an undercoat layer 72. After a refractory metal layer such as an Mo—Ta alloy is formed thereon, the refractory metal layer is patterned to form an address line 63 and a gate electrode G (first mask step).

Next, an SiNx layer (gate insulating film 76), an a-Si film (a-Si film 77), and an $n^+$-type a-Si film ($n^+$-type a-Si film 78) are respectively deposited to 300 nm, 250 nm, and 30 nm on the gate electrode G by plasma CVD without breaking the vacuum.

To prevent an interlayer short circuit from being formed by a pinhole and the like, the vacuum may be broken once, and the SiNx film may be deposited in two steps. The film qualities of the upper and lower SiNx layers may be different from each other.

Further, W and Mo are respectively deposited to 30 nm and 300 nm by sputtering to form a metal film. The 30-nm W layer constitutes the patterning regulation metal film 79a, and the 300-nm Mo layer constitutes the metal film 79.

A resist is applied to the metal film 79 and patterned to form a mask (second mask step). The Mo metal film 79 is etched by using this resist mask and an etchant of phosphoric acid, nitric acid, and acetic acid. At this time, the Mo pattern includes the patterns of a source electrode S, a drain electrode D, and a signal line 62.

With the resist being left, the resultant structure is patterned into almost the same shape as that of the Mo electrode by continuously etching the W layer, the n$^+$-type a-Si film, and the a-Si film 77 selectively with respect to the SiNx film as the gate insulating film using SF$_6$/Cl$_2$/O$_2$-based dry etching. =A transparent conductive film 81 of, e.g., ITO is deposited to 100 nm by sputtering and patterned into the shape of the pixel electrode by using a resist mask (third mask step). Further, with the resist being left on the pixel electrode, Mo (metal film 79), W (patterning regulation metal film 79a), n$^+$-type a-Si (n$^+$-type a-Si film 78), and the gate insulating film 76 consisting of SiNx on the address line electrode are selectively removed into almost the same shape as that of the pixel electrode.

As described above, even if the etching stopper is formed by a thin W alloy layer, the active matrix panel can be formed by the three mask steps according to this embodiment.

The step of patterning the transparent conductive film into the shape of the pixel electrode and selectively removing the metal film, the n$^+$-type a-Si film, and the gate insulating film consisting of SiNx on the address line by using the pixel electrode as part of a mask will be explained in detail below with reference to FIGS. 25A to 25D.

First, a resist 82 is applied to the ITO film (transparent conductive film 81) and formed into a predetermined shape by using photolithography to obtain a resist mask. Using this resist mask as a mask, the ITO film (transparent conductive film 81) is etched with a hydrochloric acid-based etchant.

Mo (metal film 79) and SiNx as the gate insulating film 76 are removed by SF$_6$/HCl/O$_2$-based plasma etching. At this time, since W is not etched, the etching can be stopped at the W layer. Then, the etching gas is changed into an SF$_6$/O$_2$-based gas to etch W and n$^+$-type a-Si (n$^+$-type a-Si film 78).

In the above embodiment, since no protection film consisting of, e.g., SiNx is formed on the TFT, the liquid crystal panel can be formed by the three mask steps. As a matter of course, the protection film consisting of, e.g., SiNx may be formed to stabilize the operation for a long time. In this case, the peripheral electrode lead-out portion and the protection film on the pixel electrode may be removed.

FIG. 26 is a plan view showing the pixel portion according to the embodiment shown in FIGS. 25A to 25D. By interposing a liquid crystal between the active matrix panel manufactured in this manner and a counter substrate having a counter electrode formed thereon, the active matrix type liquid crystal display can be formed. This step is called a liquid crystal cell step.

In the embodiment described with reference to FIGS. 23A to 26, the step at the TFT formation portion is made low to facilitate the formation of the transparent conductive film which must be formed in the pixel region including this formation portion. As a result, the yield and productivity are improved, and the cost can be reduced.

In the embodiment described with reference to FIGS. 23A to 26, the address and signal lines of the completed active matrix panel are entirely insulated from each other. If a voltage generated by a static electricity or the like is applied across the address and signal lines in this state, the TFT characteristics are undesirably degraded. Therefore, a precaution must be taken with respect to the static electricity in the liquid crystal cell step of the active matrix panel.

Taking such precaution is troublesome. To lessen this troublesomeness, there is a method of protecting a TFT from static electricity by short-circuiting all address and signal lines in advance in the process of manufacturing the active matrix panel. An interconnect for short-circuiting the address and signal lines is called a short ring.

A technique of forming this short ring is also important as a technique for the process of manufacturing the active matrix panel, and the cost of the active matrix panel is greatly influenced by the method of forming the short ring. Next, a short ring formation technique, which can minimize a hike in cost, will be explained as still another embodiment.

This embodiment relates to the technique of forming a short ring without adding any mask step. Details will be described below.

In this embodiment, a scheme of irradiating a spot laser beam in a pulse-like manner is used as a method of short-circuiting address and signal lines 63 and 62 in forming short rings. To align the laser irradiation positions in a straight line, short ring formation portions are stacked and arranged as pads projecting from the address and signal lines 63 and 62. The respective pad portions of the address and signal lines 63 and 62, which are to be aligned in order of a plurality of pairs, are aligned in a straight line. In this manner, short rings can be formed at proper positions only by linearly moving the liquid crystal panel or the laser beam to be irradiated. The process can be facilitated.

The short ring formation portions must be finally removed by cutting or laser trimming to eliminate the short circuits between the address and signal lines 63 and 62. For this purpose, the short ring formation portions are formed in a region or a position free from the possibility of cutting another necessary wire and the like even if the short ring formation portions are cut.

To facilitate the formation of short rings, the patterns of the address and signal lines 63 and 62 are so arranged as to overlap each other in the short ring formation region. A laser spot is irradiated on each overlapping portion to fuse a metal at this portion and remove an insulating film, connecting the address and signal lines 63 and 62 at the irradiated position. This conductive portion is a short ring ST.

To form the short ring ST, a laser beam is irradiated on the intersection of the address and signal lines 63 and 62. According to the irradiation method, YAG laser as a pulse laser beam is irradiated on a substrate 71 at about 1,000 pulses/sec, while the substrate 71 is moved at a predetermined rate, thereby irradiating the laser beam on predetermined positions at a constant pitch.

In this embodiment, the moving rate of the substrate 71 is about 20 mm/sec. Note that when the substrate 71 is to be moved, it is preferably linearly moved in order to simplify the moving mechanism.

The short ring ST formed in this manner must be finally removed to eliminate the short circuit between the address and signal lines 63 and 62 because the liquid crystal cell cannot be driven with the presence of the short ring ST. That is, the short ring ST must be removed at the end of the process of manufacturing the liquid crystal panel. Therefore, the step of removing the short ring ST is required.

To the contrary, there is a method which requires no removing step. According to this technique, a short ring is formed by providing a resistor having a proper resistance value at a position where the address and signal lines 63 and 62 are short-circuited. With this resistor, two functions can be obtained: the short ring effect of protecting the TFT from static electricity, and prevention of the short-circuiting state of the address and signal lines 63 and 62 in driving the liquid crystal cell. A structure wherein the short ring ST need not be removed in an additional step can be attained. In some cases, the TFT is used as a proper resistor free from any problem in driving the liquid crystal cell. FIG. 27 shows an equivalent circuit when a TFT 90 is used. This short ring formation method will be described below.

FIGS. 28A and 28B show the states of sort rings on the signal and address line sides, respectively. Short rings ST are formed by irradiating a laser spot on positions indicated by X marks outside peripheral signal and address line pads 91 and 92. In this case, a short circuit is formed by scanning the laser spot twice per side.

Figure 29A:
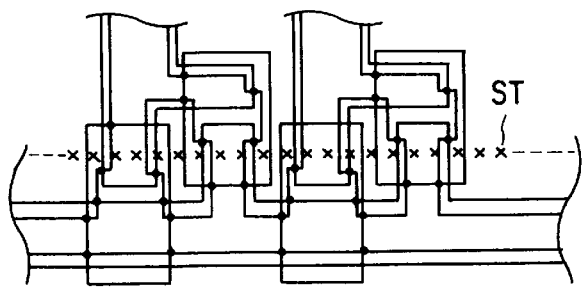
FIGS. 29A and 29B are views respectively showing the states of a modification of the short ring shown in FIGS. 28A and 28B on the signal and address line sides.
Figure 29B:
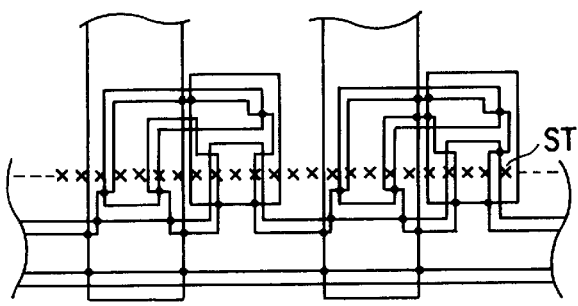

FIGS. 29A and 29B show the states of the short rings on the signal and address line sides according to a modification of the embodiment shown in FIGS. 28A and 28B. In this embodiment, the position of the laser irradiation portion is so improved as to scan the laser spot only once per side.

Figure 30A:
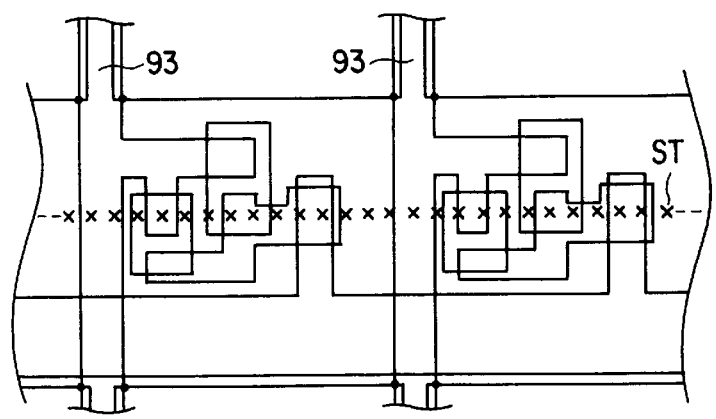
FIGS. 30A and 30B are views respectively showing the states of another modification of the short ring shown in FIGS. 28A and 28B on the signal and address line sides.
Figure 30B:
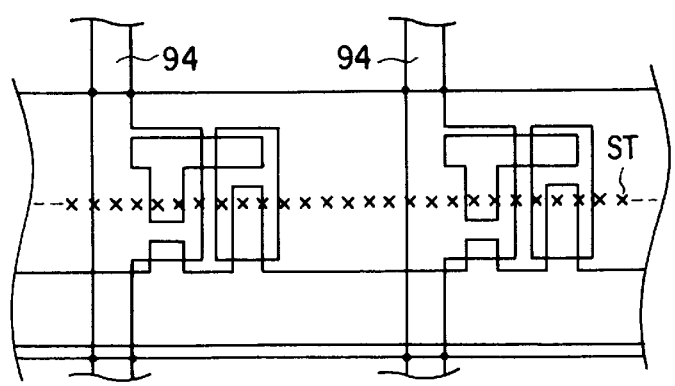
Figure 31A:
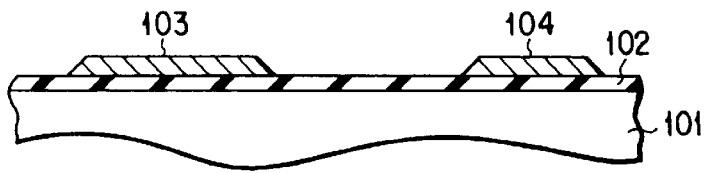
FIGS. 31A to 31F are sectional views respectively showing the steps in a method of manufacturing a conventional active matrix liquid crystal panel.
Figure 31B:
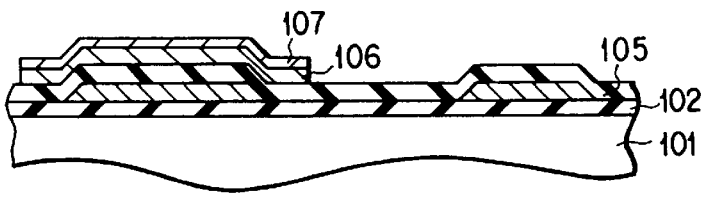
Figure 31C:
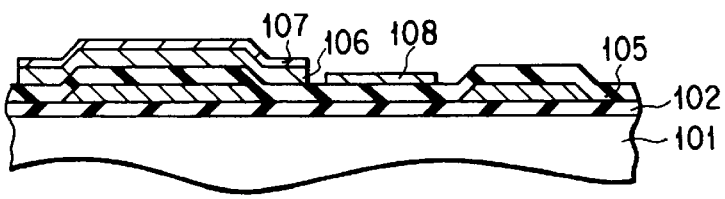
Figure 31D:
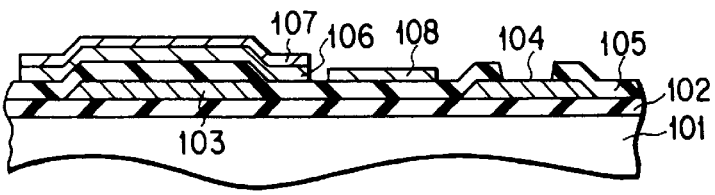
Figure 31E:
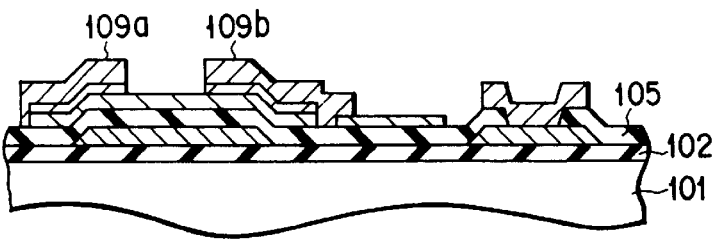
Figure 31F:
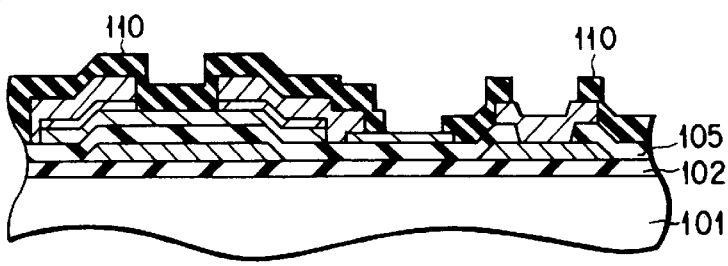

In the above arrangements, the short rings ST are set outside the peripheral pads. In this case, however, a certain area must be ensured, in the peripheral region, as a region for forming the short rings ST. As an embodiment to improve this structure, FIGS. 30A and 30B show the states of the short rings on the signal and address line sides, respectively.

In this embodiment, short rings ST are formed in regions near lines 93 and 94 each projecting from a corresponding pixel portion to a corresponding pad portion of signal and address lines. In this case, since a laser beam is linearly irradiated, the way of interrupting the laser and the moving rate of the substrate must be set not to cut another wire in a region except for the portion where the short rings ST must be formed.

The method of forming short rings without adding a new mask step has been described above. The patterns shown in the drawings can be properly changed as long as disconnections and unnecessary short circuits do not occur due to laser irradiation. At this time, it is desirable in terms of the productivity of the device that the laser irradiation portions are aligned in a straight line. In addition, if this method is used for the conventional manufacturing method, the seven mask steps in the conventional method can be reduced to six mask steps. This method can be used for another manufacturing method without any problem.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An active matrix liquid crystal panel having a plurality of pixels arrayed in a matrix format, comprising:

a plurality of signal lines and a plurality of address lines which are arranged in a grid;

a plurality of pixel electrodes arranged in correspondence with said pixels so as to be located at intersections of said signal lines and said address lines;

a counter electrode opposing said pixel electrodes;

a liquid crystal layer arranged between said pixel electrodes and said counter electrode;

a plurality of transistors respectively arranged adjacent to said pixel electrodes, each transistor having a semiconductor active layer constituting a pair of source and drain regions and a channel region, a pair of source and drain electrodes for respectively connecting the source and drain regions to a corresponding pixel electrode and a corresponding signal line, and a gate electrode opposing the channel region via a gate insulating layer and connected to a corresponding address line; and a plurality of auxiliary capacitances respectively arranged adjacent to said pixel electrodes, each auxiliary capacitance having a pair of upper and lower electrodes electrically connected substantially in parallel to a corresponding pair of pixel electrodes and the counter electrode, a dielectric layer sandwiched between said upper and lower electrodes, and a semiconductor intervening layer sandwiched between said dielectric layer and said upper electrode, wherein said active layer and said intervening layer respectively comprise portions formed of a common semiconductor film, said active layer and said gate insulating layer have substantially a same plan-view contour at a position where said source and drain electrodes overlap with said gate electrode, and said intervening layer and said dielectric layer have substantially a same plan-view contour at a position where said upper electrode overlaps with said lower electrode.

2. A panel according to claim 1, wherein said gate electrode, said lower electrode, and said address line respectively comprise portions formed of a common lower-level conductive film arranged on an insulating surface of a support substrate, said source and drain electrodes, said upper electrode, and said signal line respectively comprise portions formed of a common middle-level conductive film, and said pixel electrode comprises a portion formed of an upper-level conductive film.

3. A panel according to claim 2, wherein said signal line further comprises a portion formed of said upper-level conductive film arranged on said portion formed of said middle-level conductive film.

4. A panel according to claim 3, wherein said address line further comprises a portion formed of said upper-level conductive film arranged on said portion formed of said lower-level conductive film.

5. A panel according to claim 3, wherein said pixel electrode and said upper electrode are connected via a portion formed of said upper-level conductive film.

6. A panel according to claim 2, wherein said upper-level conductive film is transparent.

7. A panel according to claim 2, wherein said middle-level conductive film has a core metal layer having a low electrical resistance and a pair of upper and lower protection metal layers sandwiching said core metal layer therebetween.

8. A panel according to claim 1, wherein said gate electrode, said lower electrode, and said signal line respectively comprise portions formed of a common lower-level conductive film arranged on an insulating surface of a support substrate, said source and drain electrodes, said upper electrode, and said address line respectively comprise portions formed of a common middle-level conductive film, said pixel electrode comprises a portion formed of an upper-level conductive film, and said signal line is smaller in width than said address line at said intersections.

9. A panel according to claim 8, wherein said address line further comprises a portion formed of said upper-level conductive film arranged on said portion formed of said middle-level conductive film.

10. A panel according to claim 9, wherein said gate electrode and said address line are connected via a portion formed of said upper-level conductive film.

11. A panel according to claim 10, wherein said signal line further comprises a portion formed of said upper-level conductive film arranged on said portion formed of said lower-level conductive film.

12. An active matrix liquid crystal panel having a plurality of pixels arrayed in a matrix format, comprising:

a plurality of signal lines and a plurality of address lines which are arranged in a grid;

a plurality of pixel electrodes arranged in correspondence with said pixels so as to be located at intersections of said signal lines and said address lines;

a counter electrode opposing said pixel electrodes;

a liquid crystal layer arranged between said pixel electrodes and said counter electrode; and a plurality of transistors respectively arranged adjacent to said pixel electrodes, each transistor having a semiconductor active layer constituting a pair of source and drain regions and a channel region, a pair of source and drain electrodes for respectively connecting the source and drain regions to a corresponding pixel electrode and a corresponding signal line, and a gate electrode opposing the channel region via a gate insulating layer and connected to a corresponding address line, wherein said gate electrode and said signal line respectively comprise portions formed of a common lower-level conductive film arranged on an insulating surface of a support substrate, said source and drain electrodes and said address line respectively comprise portions formed of a common middle-level conductive film, and said pixel electrode comprises a portion formed of an upper-level conductive film, said signal line being smaller in width than said address line at said intersections.

13. A panel according to claim 12, wherein said address line further comprises a portion formed of said upper-level conductive film arranged on said portion formed of said middle-level conductive film.

14. A panel according to claim 13, wherein said gate electrode and said address line are connected via a portion formed of said upper-level conductive film.

15. A panel according to claim 14, wherein said signal line further comprises a portion formed of said upper-level conductive film arranged on said portion formed of said lower-level conductive film.

16. A panel according to claim 12, wherein said upper-level conductive film is transparent.

17. A panel according to claim 12, wherein said middle-level conductive film has a core metal layer having a low electrical resistance and a pair of upper and lower protection metal layers sandwiching said core metal layer therebetween.

18. A panel according to claim 12, further comprising a plurality of auxiliary capacitances respectively arranged adjacent to said pixel electrodes, each auxiliary capacitance having a pair of upper and lower electrodes electrically connected substantially in parallel to a corresponding pair of pixel and counter electrodes, and a dielectric layer sandwiched between said upper and lower electrodes, wherein said lower electrode comprises a portion formed of said lower-level conductive film, and said upper electrode comprises a portion formed of said middle-level conductive film.

19. A panel according to claim 18, wherein each auxiliary capacitance further comprises a semiconductor intervening layer sandwiched between said dielectric layer and said upper electrode, said active layer and said intervening layer respectively comprise portions formed of a common semiconductor film.

20. A panel according to claim 18, wherein said pixel electrode and said upper electrode are connected via a portion formed of said upper-level conductive film.

21. A panel according to claim 18, wherein said pixel electrode and said lower electrode are connected via a portion formed of said upper-level conductive film.

* * * * *